United States Patent
Lerner et al.

(10) Patent No.: US 8,108,653 B2
(45) Date of Patent: Jan. 31, 2012

(54) PROCESSOR ARCHITECTURES FOR ENHANCED COMPUTATIONAL CAPABILITY AND LOW LATENCY

(75) Inventors: Boris Lerner, Sharon, MA (US); Douglas Garde, Dover, MA (US)

(73) Assignee: Analog Devices, Inc., Norwood, MA (US)

( * ) Notice: Subject to any disclaimer, the term of this patent is extended or adjusted under 35 U.S.C. 154(b) by 0 days.

(21) Appl. No.: 12/701,090

(22) Filed: Feb. 5, 2010

(65) Prior Publication Data

US 2010/0174883 A1 Jul. 8, 2010

Related U.S. Application Data

(63) Continuation-in-part of application No. 12/008,220, filed on Jan. 9, 2008.

(51) Int. Cl.
  G06F 15/80 (2006.01)
  G06F 15/82 (2006.01)
(52) U.S. Cl. ............... 712/22; 712/18; 712/25; 712/201
(58) Field of Classification Search .................. 712/11, 712/18, 22, 25, 201
  See application file for complete search history.

(56) References Cited

U.S. PATENT DOCUMENTS 5,896,543 A 4/1999 Garde
5,954,811 A 9/1999 Garde
7,636,835 B1 * 12/2009 Ramey et al. ............... 712/11
2009/0177867 A1 7/2009 Garde

FOREIGN PATENT DOCUMENTS

EP 0208457 1/1987
WO WO-03025781 3/2003

OTHER PUBLICATIONS

Intrinsity data sheets and other information, http://www.intrinsity.com, Jul. 21, 2004, 24 pages.
ClearSpeed data sheets and other information, http://www.clearspeed.com, Jul. 21, 2004, 12 pages.
International Search Report and Written Opinion mailed May 12, 2011 for International Application No. PCT/US2011/023666 (3 pages).
Lenders et al., "Microprogramming Instructions Systolic Arrays," International Symposium on Microarchitecture: Proceedings of the 22nd Annual Workshop on Microprogramming and MicroArchitecture, ACM, pp. 56-69 (1989).

* cited by examiner

Primary Examiner — William M Treat
(74) Attorney, Agent, or Firm — Bingham McCutchen LLP

(57) ABSTRACT

A processor includes a compute array comprising a first plurality of compute engines serially connected along a data flow path such that data flows between successive compute engines at successive times. The first plurality of compute engines includes an initial compute engine and a final compute engine. The data flow path includes a recirculation path connecting the final compute engine to the initial compute engine with no compute engine therebetween.

26 Claims, 21 Drawing Sheets

PROCESSOR ARCHITECTURES FOR ENHANCED COMPUTATIONAL CAPABILITY AND LOW LATENCY

RELATED APPLICATION

This application is a continuation-in-part of and claims priority to U.S. patent application Ser. No. 12/008,220, filed Jan. 9, 2008, the entire disclosure of which is incorporated by reference herein.

TECHNICAL FIELD

This invention relates to processor architectures and, more particularly, to digital signal processor architectures that facilitate high performance digital signal processing computations. The disclosed digital signal processors may be utilized with other processors or as stand-alone processors.

BACKGROUND

A digital signal processor (DSP) is a special purpose computer that is designed to optimize performance for digital signal processing applications, such as, for example, fast Fourier transforms, digital filters, image processing, signal processing in wireless systems and speech recognition. DSP applications are typically characterized by real-time operation, high interrupt rates and intensive numeric computations. In addition, DSP applications tend to be intensive in memory access operations and to require the input and output of large quantities of data. DSP architectures are typically optimized for performing such computations efficiently.

The core processor of a DSP typically includes a computation block, a program sequencer, an instruction decoder and all other elements required for performing digital signal computations. The computation block is the basic computation element of the DSP and typically includes one or more computation units, such as a multiplier and an arithmetic logic unit (ALU), and a register file.

Digital signal computations are frequently repetitive in nature. That is, the same or similar computations may be performed multiple times with different data. Thus, any increase in the speed of individual computations is likely to provide significant enhancements in the performance of the DSP.

Some applications, such as base stations in wireless systems, have performance and timing requirements that exceed the capabilities of current DSPs. To meet these requirements, designers have used DSPs in combination with ASICs (application specific integrated circuits) and/or FPGAs (field programmable gate arrays). Such systems lack flexibility and are relatively expensive. Further, the required performance increases as next generation wireless systems are introduced. High power dissipation is usually a problem in high performance processors.

DSP designs may be optimized with respect to different operating parameters, such as computation speed, power consumption and ease of programming, depending on intended applications. Furthermore, DSPs may be designed for different word sizes. A 32-bit architecture that utilizes a long instruction word and wide data buses and which achieves high operating speed is disclosed in U.S. Pat. No. 5,954,811, issued Sep. 21, 1999 to Garde, the entire disclosure of which is incorporated by reference herein. The core processor includes dual computation blocks. Notwithstanding very high performance, the disclosed processor does not provide an optimum solution for all applications.

Furthermore, even DSPs that incorporate multiple computation blocks generally suffer from latency as instructions or data circulate and recirculate among all or a subset of the computation blocks.

Accordingly, there is a need for further innovations in DSP architecture and performance.

SUMMARY

Latency is decreased in a DSP configured to recirculate data and instructions among a group of individual compute engines within the processor. The compute engines are arranged such that, once the data and/or instructions have progressed from the initial compute engine to the final compute engine, the data and/or instructions recirculate back to the initial compute engine with low latency. The low-latency recirculation path directly connects the final compute engine with the initial compute engine in the sense that the data and/or instructions do not traverse other compute engines within the processor during recirculation, and thus recirculation may be completed within, e.g., a single clock cycle. The flow of data and/or instructions (and subsequent recirculation) may proceed through all of the compute engines in the processor or through only a subset of the compute engines.

In an aspect, embodiments of the invention feature a processor including a compute array. The compute array includes or consists essentially of a first plurality of compute engines serially connected along a data flow path such that data flows between successive compute engines at successive times. The first plurality of compute engines includes or consists essentially of an initial compute engine and a final compute engine, and the data flow path includes or consists essentially of a recirculation path connecting the final compute engine to the initial compute engine with no compute engine therebetween.

The processor may include a second plurality of compute engines configured to recirculate data independent of the first plurality of compute engines. The recirculation path may be configured to recirculate data from the final compute engine to the initial compute engine in one clock cycle. The first plurality of compute engines may consist essentially or consist of the initial compute engine and the final compute engine. The first plurality of compute engines may consist essentially or consist of the initial compute engine, the final compute engine, and six additional compute engines disposed therebetween on the data flow path. The first plurality of compute engines may consist essentially or consist of the initial compute engine, the final compute engine, and two additional compute engines disposed therebetween on the data flow path. The first plurality of compute engines may consist essentially or consist of the initial compute engine, the final compute engine, and fourteen additional compute engines disposed therebetween on the data flow path.

The processor may include a control block for issuing instructions to the compute array based on a stored program, and the compute array may be configured to execute the issued instructions in successive compute engines at successive times. The processor may include a memory operative with each of the first plurality of compute engines. Each of the first plurality of compute engines may have a pipeline architecture. The processor may be disposed within a digital signal processor that includes a control processor.

In another aspect, embodiments of the invention feature a method of forming a processor that includes forming a compute array. The compute array includes or consists essentially of a first plurality of compute engines serially connected along a data flow path such that data flows between successive compute engines at successive times. The first plurality of compute engines includes or consists essentially of an initial compute engine and a final compute engine, and the data flow path includes or consists essentially of a recirculation path connecting the final compute engine to the initial compute engine with no compute engine therebetween.

In yet another aspect, embodiments of the invention feature a method of data processing in a compute array that includes or consists essentially of a first plurality of compute engines. The first plurality of compute engines includes or consists essentially of an initial compute engine, a final compute engine, and at least one compute engine therebetween. Data is flowed between successive compute engines at successive times, beginning with the initial compute engine. After data flows to the final compute engine, data is recirculated from the final compute engine directly to the initial compute engine.

Data may be flowed among a second plurality of compute engines independent of the first plurality of compute engines. Data may recirculate from the final compute engine to the initial compute engine in one clock cycle. The first plurality of compute engines may consist essentially or consist of the initial compute engine and the final compute engine. Two, six, or fourteen additional compute engines disposed between the initial compute engine and the final compute engine may be formed on the data flow path.

In a further aspect, embodiments of the invention feature a processor including or consisting essentially of a compute array, a data flow path, and a recirculation path. The compute array includes or consists essentially of at least three compute engines. The data flow path connects the compute engines, data flowing along the data path between successive compute engines at successive times. The recirculation path directly connects two compute engines not directly connected along the data flow path.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the invention. In the following description, various embodiments of the present invention are described with reference to the following drawings, in which.

DETAILED DESCRIPTION

Figure 1:
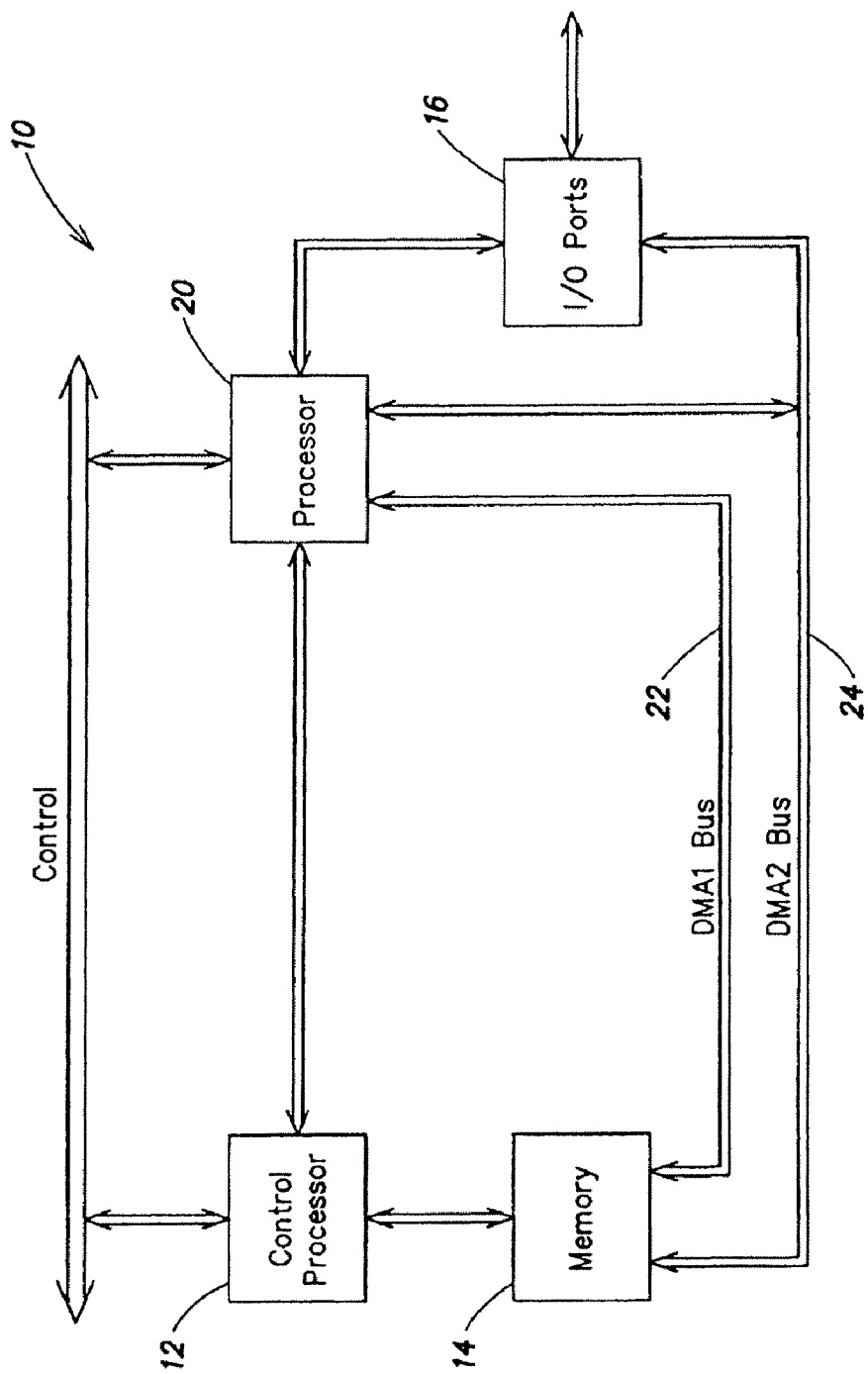
FIG. 1 is a schematic block diagram of a DSP in accordance with an embodiment of the invention.

A schematic block diagram of a DSP in accordance with an embodiment of the invention is shown in FIG. 1. A DSP 10 includes a control processor 12, a memory 14, I/O ports 16 and a processor 20. The control processor 12 interacts with processor 20 and accesses memory 14. A DMA1 bus 22 carries data between memory 14 and processor 20. A DMA2 bus 24 carries data between memory 14, processor 20 and I/O ports 16. I/O ports 16 may communicate directly with processor 20 through a FIFO or an I/O buffer. I/O ports 16 provide an interface to external memory, external devices and/or an external processor, such as a host computer.

By way of example, control processor 12 may have an architecture of the type disclosed in U.S. Pat. No. 5,896,543, issued Apr. 20, 1999 to Garde (the entire disclosure of which is incorporated by reference herein) and sold by Analog Devices, Inc. as the TigerSharc DSP. The memory 14 may include three independent, large capacity memory banks. In a preferred embodiment, each of the memory banks has a capacity of 64K words of 32 bits each. Each of the memory banks may have a 128-bit data bus, so that up to four consecutive aligned data words of 32 bits each can be transferred to or from each memory bank in a single clock cycle.

Figure 2:
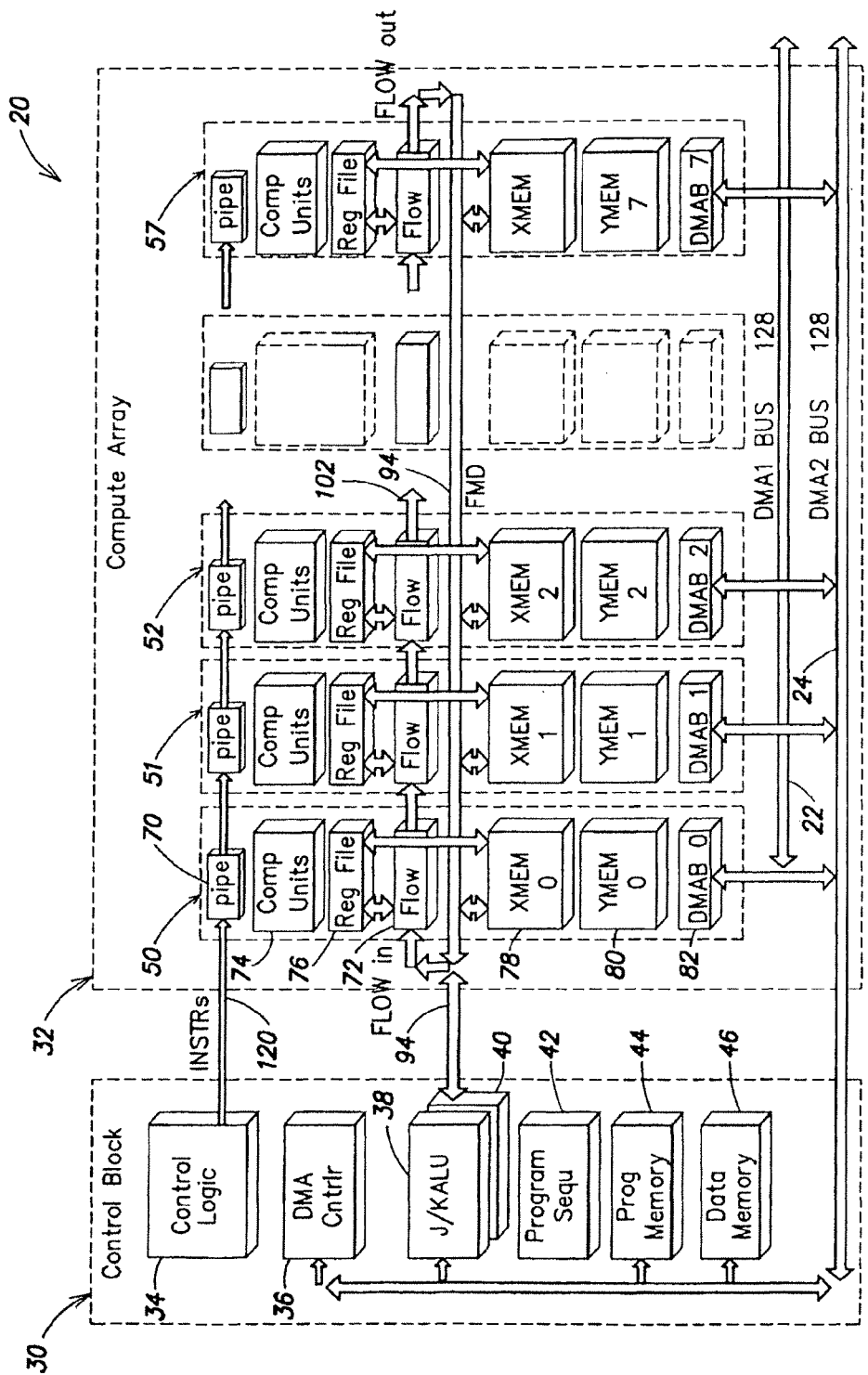
FIG. 2 is a schematic block diagram of an embodiment of the processor shown in FIG. 1.

A schematic block diagram of a first embodiment of processor 20 is shown in FIG. 2. Processor 20 may include a control block 30 and a compute array 32. Control block 30 may include control logic 34, a DMA controller 36, integer ALUs 38 and 40, a program sequencer 42, a program memory 44 and a data memory 46. Control block 30 issues instructions and data addresses to compute array 32 based on a stored program.

Compute array 32 includes two or more compute engines. In the embodiment of FIG. 2, compute array 32 includes eight compute engines 50, 51, 52, . . . , 57. Each compute engine may be referred to as a "section" of the compute array. The compute engines are connected serially such that instructions issued by control block 30 and corresponding data advance, or "flow", through the compute engines 50, 51, 52, . . . , 57 and are executed in each of the compute engines at successive times. In applications where grouping of compute engines is utilized, as discussed below, instructions issued by control block 30 and corresponding data flow through a subset, or group, of the compute engines and are executed at successive times. In one embodiment, instructions advance through successive compute engines on successive clock cycles. By way of example, an instruction issued by control block 30 may advance to compute engine 50 on clock cycle 1, to compute engine 51 on clock cycle 2 and to compute engine 57 on clock cycle 8. However, the invention is not limited in this respect, and each instruction may advance from one compute engine to the next compute engine after any number of clock cycles. Furthermore, instructions do not necessarily enter compute array 32 at the first compute engine, but can enter at any of the compute engines. This, feature is useful, for example, in applications which utilize grouping of compute engines. Each of the compute engines may be individually pipelined and thus may require several clock cycles to complete execution of an instruction. In addition, data flows to successive compute engines at successive times as described in detail below.

In the embodiment of FIG. 2, instructions flow through all or a subset of the compute engines on successive clock cycles. In other embodiments, instructions issued by control block 30 can be broadcast to all of the compute engines or a subset of the compute engines. In this embodiment, the broadcast instructions are delayed according to the position of the compute engine in the compute array such that each broadcast instruction executes in successive compute engines at successive times. For example, a broadcast instruction may have no delay in compute engine 50, a one clock cycle delay in compute engine 51, a two cycle delay in compute engine 52, etc. In each case, each issued instruction executes in successive compute engines at successive times. In cases where grouping of compute engines is utilized, each instruction executes in successive compute engines of the group at successive times.

Figure 3:
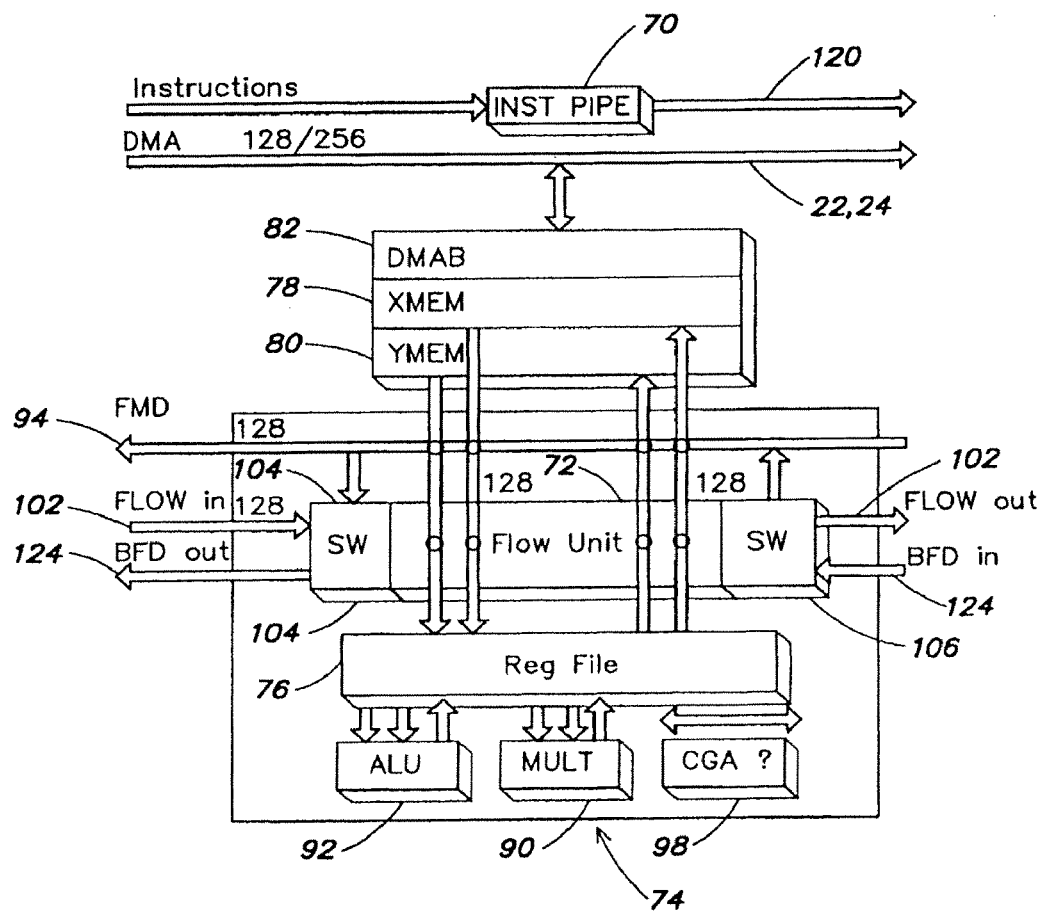
FIG. 3 is a schematic block diagram of an embodiment of one of the compute engines shown in FIG. 2.

A schematic block diagram of an embodiment of a single compute engine is shown in FIG. 3. Each compute engine includes an instruction pipe 70 for controlling instruction flow through the array of compute engines and a flow unit 72 for controlling data flow in the array of compute engines. Instruction pipes 70 in successive compute engines are coupled together by an instruction bus 120. Flow units 72 in successive compute engines are coupled together by a flow bus 102. In general, each compute engine can be configured with one or more flow units and one or more flow buses. Instruction pipe 70 holds instructions and provides control signals to the compute engine for execution of the instructions. The instruction pipe 70 in each compute engine may be one or more clock cycles in length. In one embodiment, instruction pipe 70 in each compute engine is one clock cycle in length.

Each compute engine further includes a compute block 74, a register file 76 and a DMA buffer 82. In the embodiment of FIG. 2, each compute engine includes an X-memory 78 and a Y-memory 80. The memory associated with each of the compute engines may be implemented as an SRAM. As discussed below, the memory may be implemented in different ways. In another embodiment, each compute engine may include a single memory. Compute block 74 may include one or more compute units. Compute block 74 may include a multiplier 90, an arithmetic logic unit (ALU) 92, and a MAC (multiplier accumulator) adder 96 (FIG. 12), for example. Compute block 74 interacts with register file 76 to perform digital signal computations in response to an instruction in instruction pipe 70. Register file 76 interacts with memories 78 and 80 and with flow unit 72 to obtain specified data for the digital signal computations and to provide results to specified destinations. The data locations and the result destinations are specified by instructions. Data is transferred to and from memories 78 and 80 through DMA buffer 82 and DMA buses 22 and 24. In some embodiments, compute block 74 may include a configurable gate array (CGA) 98.

Figure 10A:
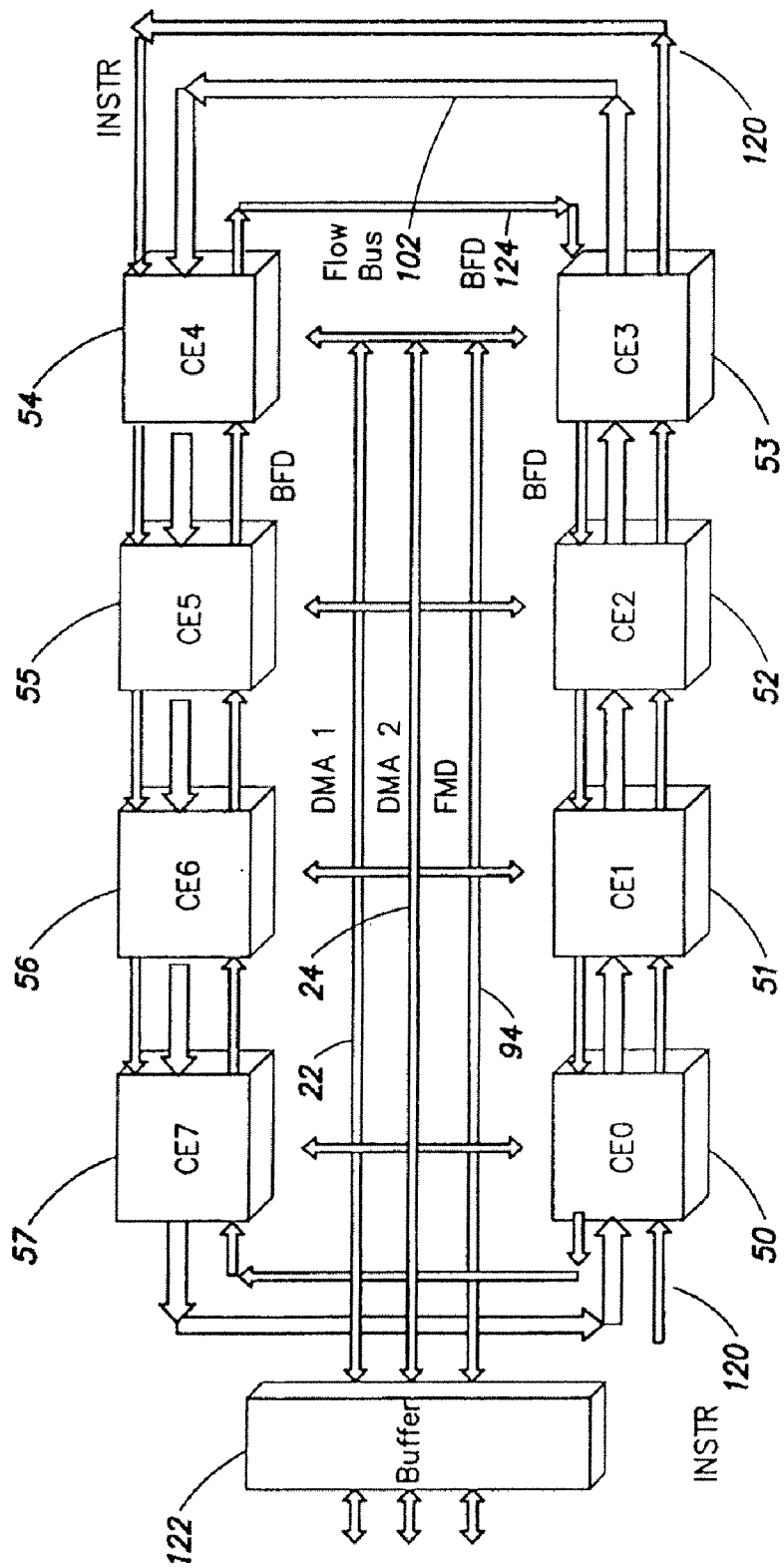
FIG. 10A is a schematic block diagram of the compute array, showing datapath buses in accordance with an embodiment of the invention.

A flow memory data (FMD) bus 94, flow bus 102 and a back flow data (BFD) bus 124 are coupled to an input of flow unit 72 through a switch 104. FMD bus 94, flow bus 102 and BFD bus 124 are coupled to an output of flow unit 72 through a switch 106. In a normal mode of operation, switch 104 connects the input of flow unit 72 via flow bus 102 to the flow unit in the previous compute engine and flow data is received from the previous compute engine on flow bus 102. In the normal mode, switch 106 connects the output of flow unit 72 via flow bus 102 to the flow unit in the next compute engine, and flow data is supplied to the next compute engine on flow bus 102. When grouping of compute engines is utilized, as described below, switch 106 connects flow output 102 to BFD bus 124 in the last compute engine of a group, so that flow data is maintained within a group of compute engines. In the case of a flow load operation, FMD bus 94 is connected by switch 104 to the input of flow unit 72 in a selected compute engine, thereby connecting memory to flow unit 72. In the case of a flow store operation, the output of flow unit 72 in a selected compute engine is connected by switch 106 to FMD bus 94. When the compute array 32 is used in a recirculate mode, flow data output from the last compute engine 57 is coupled on flow bus 102 to the flow data input of first compute engine 50, as shown in FIG. 10A.

Figure 4:
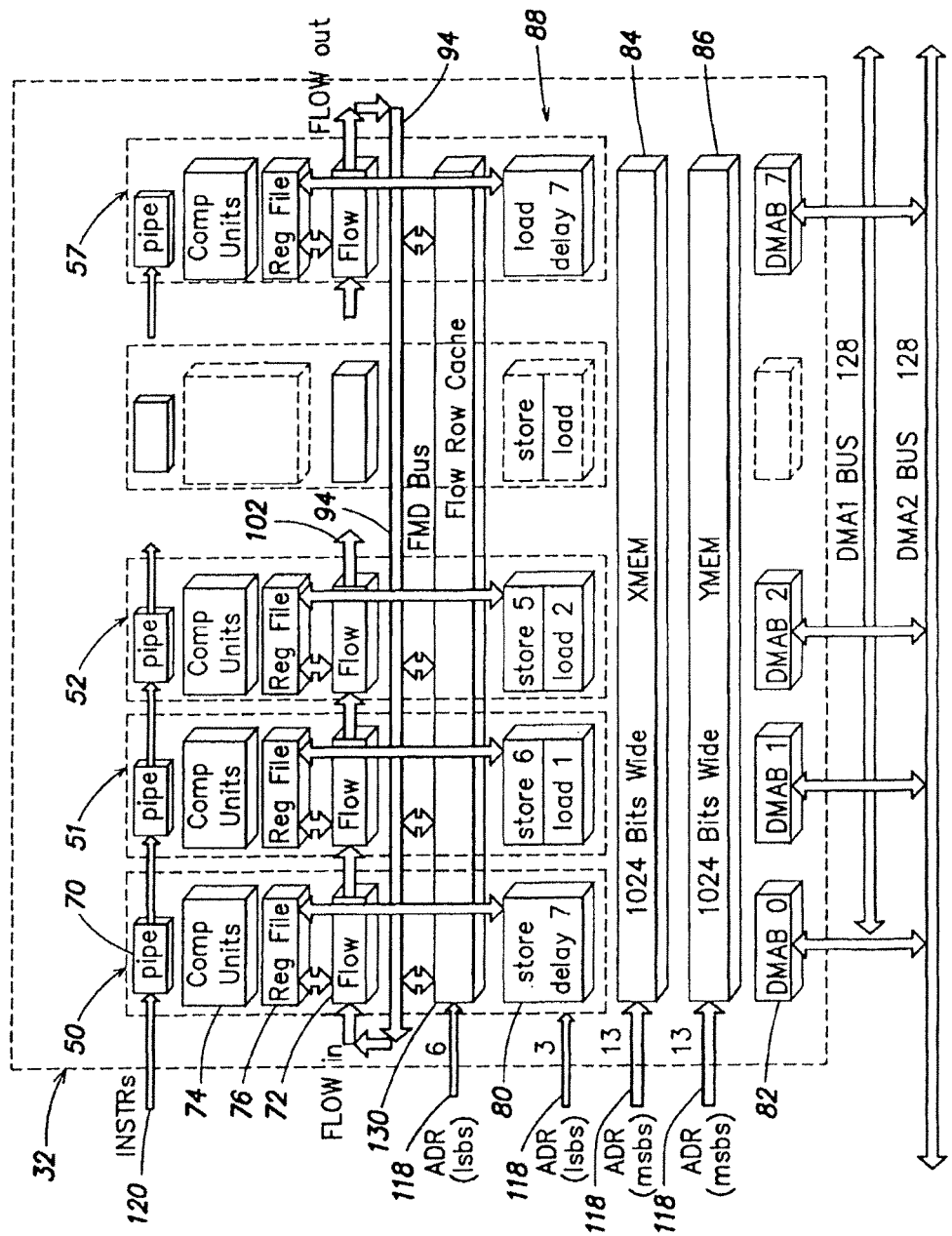
FIG. 4 is a schematic block diagram of a second embodiment of the compute array shown in FIG. 2.

A schematic block diagram of a second embodiment of compute array 32 is shown in FIG. 4. Like elements in FIGS. 2 and 4 have the same reference numerals. The embodiment of FIG. 4 includes compute engines 50, 51, 52, . . . , 57. In the embodiment of FIG. 4, each compute engine does not include an individual X-memory and a Y-memory. Instead, compute array 32 includes a single X-memory 84 and a single Y-memory 86, which are accessed by each of the compute engines. Each memory 84, 86 may be a DRAM and may have a row width that is sufficient for parallel load/store operations with each of the compute engines. For example, memories 84 and 86 may be 1024 bits wide in order to load/store four 32-bit words in parallel for each of the eight compute engines. The use of a large DRAM may be more space-efficient than eight smaller SRAMs. Instead of implementing eight memory sections, a single DRAM can be utilized by interposing staging buffers between the DRAM and the compute engines so as to provide the data in a row, sequentially, to each section of the compute array. Memory accesses pass through a staging buffer 88 which functions similar to a delay line. A load delay line in staging buffer 88 has a delay that increases with section number. That is, section 0 has no delay, section 1 has a one-cycle delay, etc., and section 7 has a seven-cycle delay. For a store delay line in the staging buffer 88, the delay is reversed. That is, section 0 has a seven-cycle delay, section 1 has a six-cycle delay, etc., and section 7 has no delay. The staging buffer 88 can be built with dynamic logic, since it is cleared in eight clock cycles.

Compute array 32 may have different memory configurations within the scope of the invention. FIG. 2 illustrates an embodiment wherein each compute engine includes X-memory 78 and Y-memory 80, and FIG. 4 illustrates an embodiment wherein compute array 32 includes single X-memory 84 and single Y-memory 86. In other embodiments, each compute engine may include a single memory or more than two memories. In further embodiments, a single memory may serve the entire compute array. In additional embodiments, the compute array may include one memory, typically a larger memory, that serves the entire compute array and individual section memories, typically smaller memories, that are associated with respective compute engines. In general, one or more memories may be configured to serve one, two, four, or eight compute engines in those embodiments having eight compute engines.

Compute array 32 may include a row cache 130 (FIG. 4) which allows a data row of 1024 bits to be cached in a single cycle for flow accesses. This frees up the memory on subsequent flow accesses to that row. Because of the row cache, the programmer does not need to access quad words in order to minimize memory accesses. This often simplifies and reduces the size of the program. It also reduces power dissipation and allows better DMA access to memory. The row cache 130 preferably includes a load row cache (LRC) and a store row cache (SRC). Preferably, the row caches support only flow access, and not SIMD access. The row cache may be used in the embodiments of FIGS. 2 and 2A. Compute array 32 may include one or more load row caches and one or more store row caches.

The load row cache holds a currently accessed entire row of memory. It is automatically loaded the first time a flow load instruction is executed. Its function is to act like a cache to reduce the number of subsequent flow accesses to memory. It also provides an unpack function, particularly for short words. The controller does not access memory for flow again until the row address changes. For example, this buffer can hold 64 short words and save 63 accesses to memory.

The store row cache packs incoming flow results until filled. When filled, the store row cache initiates a store to memory. It acts like a cache to reduce multiple individual accesses to memory. It also provides a pack function, particularly for short words. The controller does not store the store row cache to memory until the row address changes or until the row cache is full. For example, this buffer can hold 64 short word results and save 63 accesses to memory.

The control block 30 issues load/store and compute instructions for compute array 32. Instructions enter the compute array from the left and flow from one section to the next on every clock cycle until they exit the array, eight clock cycles later. Data entering the array flows in the same way through the array, as specified by an instruction. In a similar way, the results of computations flow across the compute engines as specified by an instruction, and when flow is completed, the results can be stored in memory. Data and results may recirculate through the compute array 32 if more than eight compute engines are needed for an application. Conversely, the eight compute engines may be configured into groups for applications that require fewer compute engines. Groups are implemented by a switch in each compute engine. The memory in each compute engine is a common resource for all the compute engines when using flow instructions but is a local resource for SIMD (single instruction, multiple data) instructions.

Instructions, data and results flow across the array horizontally from section to section, on each clock cycle. This flow creates the programming illusion that there is one processor and one memory, whether processing horizontally across the array, vertically in SIMD fashion, or in a combination of both, hence SIMD-FLOW. The ability to perform SIMD and flow operations at the same time adds significantly to the versatility of the architecture. The versatility of the flow architecture is enhanced by the ability to group the sections during flow operations to allow tasks that require a smaller number of operations to be optimally managed. With SIMD operations, there can be a considerable difference in what each section does. This is because most instructions can be conditional or can be modified by the unique ID of each section.

In embodiments which include an individual memory in each section of the compute array, each section can perform an independent table lookup. Table lookup from memory can be performed in each section by adding an address offset register in each section to a common address broadcast to all sections by the address generator in the control block 30. This allows each section to perform in an individual table lookup. The table is duplicated in each section to allow this simultaneous lookup. The memory access instruction has a bit that specifies whether the address offset register is invoked.

Different addressing schemes may be utilized for SIMD operations (non-flow operations within a single compute engine) and flow operations (operations across compute engines). The addressing scheme is selected based on the instruction type.

Figure 5:
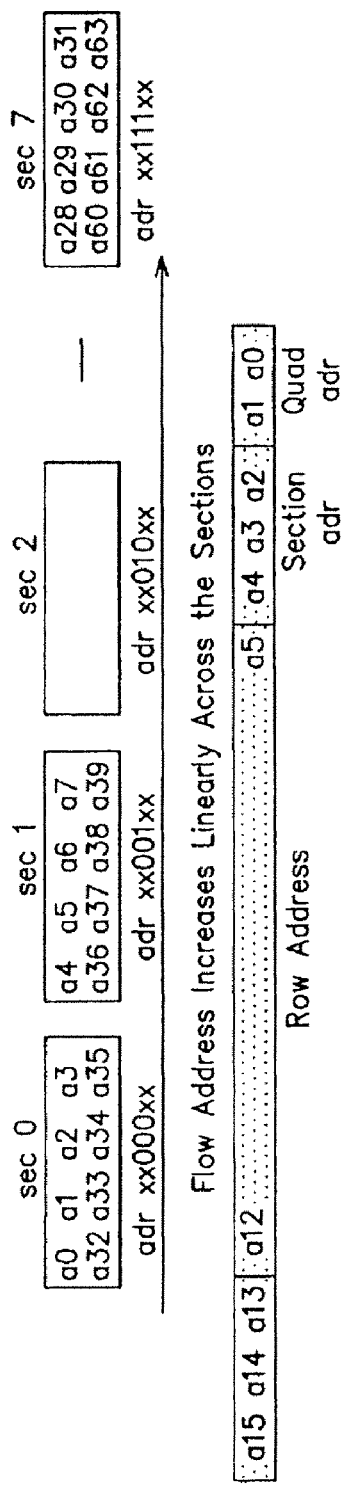
FIG. 5 is a schematic block diagram that illustrates a memory address space for flow operations in accordance with an embodiment of the invention.

For flow memory accesses, the memory appears as a single, very wide word memory, with each row having 1024 bits or 32 words of 32 bits each in the embodiment which includes eight sections, each having a memory row of four 32-bit words. To accomplish this, each memory section responds only to its column address. The flow address applies to only one memory section. The selected section places its data on the FMD bus 94. When using groups, the flow address is common to each group. Thus, for two groups of four sections each, the row size is 16 words but there are two sets of this row address. A flow addressing scheme in accordance with an embodiment of the invention is illustrated in FIG. 5. As shown in FIG. 5, the flow address increases linearly across all sections.

Figure 6:
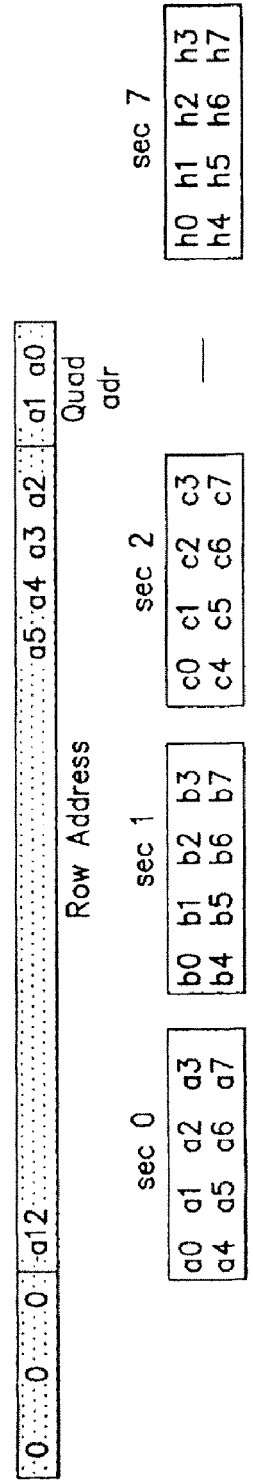
FIG. 6 is a schematic block diagram that illustrates a memory address space for SIMD operations in accordance with an embodiment of the invention.

For SIMD memory accesses, the X-memory and the Y-memory each appear as eight parallel memory banks. Each memory section receives an identical address and operates identically. Thus data is stored as eight data sets. The address and control for the memory sections flows from left to right on each clock cycle on the instruction flow bus 120, so that successive sections respond on successive cycles. The SIMD memory may be summarized as including eight identical memories, each section having a common address. The address is broadcast to all sections, and each section has four 32-bit words per row. The address space is that of one section. Thus, a load instruction loads one or more registers in each section from the same address in each memory section. However, each section responds one cycle after the previous section since the instruction flows across the array. A SIMD memory addressing scheme in accordance with an embodiment of the invention is illustrated in FIG. 6. As shown in FIG. 6, the SIMD address increases within each section.

While FIGS. 5 and 6 illustrate different addressing schemes for flow operation and SIMD operation, it should be understood that different addressing schemes are not required. More particularly, a linear address space may be utilized for both flow operations and SIME operations. In that case, the SIMD memory access uses a larger address increment to access the next memory row.

Figure 6A:
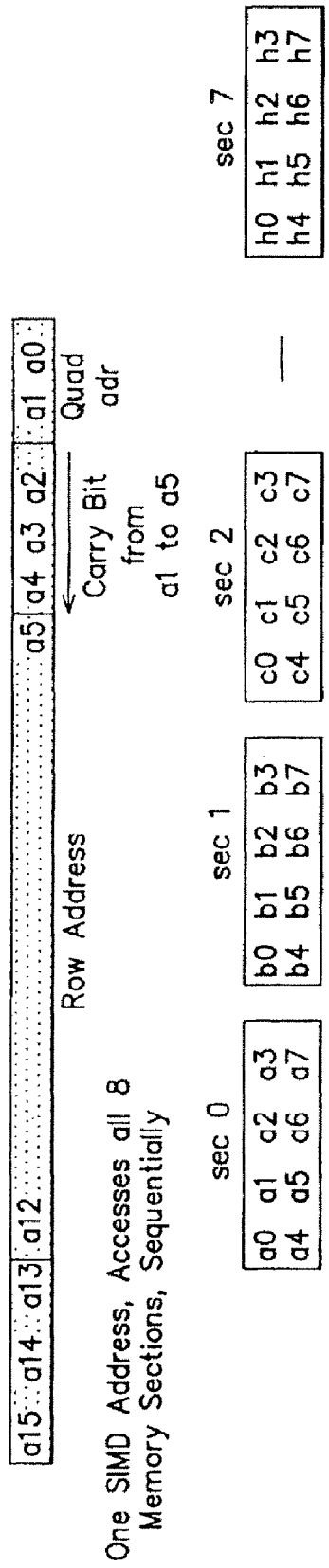
FIG. 6A is a schematic block diagram that illustrates a memory address space for SIMD operations in accordance with another embodiment of the invention.

A SIMD memory addressing scheme in accordance with another embodiment of the invention is illustrated in FIG. 6A. This addressing scheme allows the same memory address space to be used for both flow operations and SIMD operations. For SIMD memory accesses, the address generator increments the SIMD addresses on a modulo 32 basis at each quad boundary, i.e., the carry from address bit a1 carries to address bit a5. This is because the compute array itself implicitly increments the bits a4:2. Thus, the address space can remain identical and linear for SIMD and flow operations. The address generator modifies the address such that the carry from bit a1 is connected to bit a5 to adjust for the fact that the intervening bits are incremented implicitly in the array. Thus, an increment by one would cause the address to go from 0, 1, 2, 3, 32, 33, 34, 35, 64, 65, 66, etc. The intervening addresses are implicitly used in the array for SIMD accesses. The X-memory and Y-memory each appear as eight parallel memory banks. Each memory section receives an identical address and operates identically. Thus, data is stored as eight data sets. The address and control for the memory sections flows from left to right on each clock cycle (on the instruction flow bus) so that successive sections respond on successive cycles.

Figure 7:
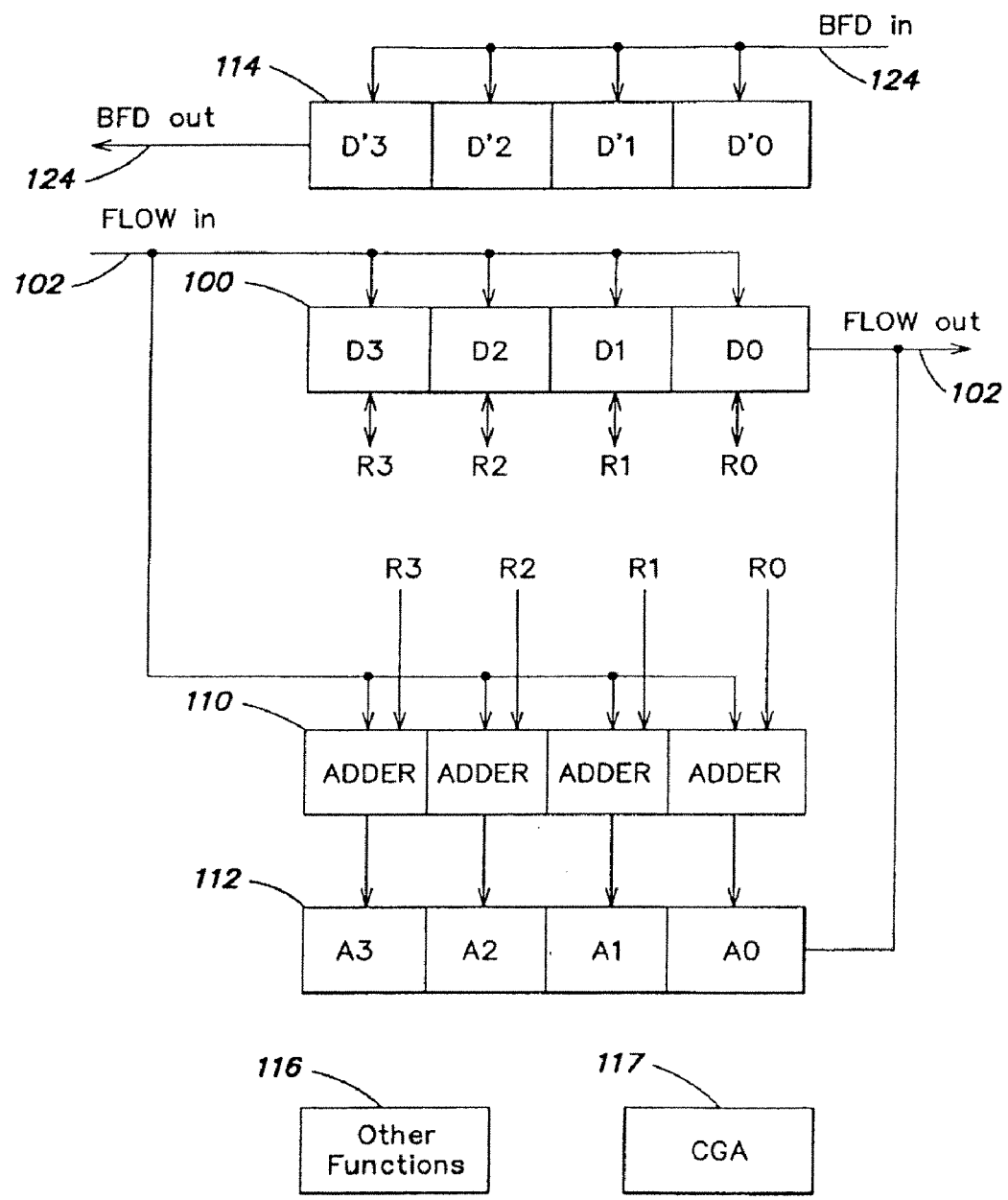
FIG. 7 is a schematic block diagram of the flow unit in accordance with an embodiment of the invention.

A schematic block diagram of flow unit 72 in accordance with an embodiment of the invention is shown in FIG. 7. A quad D register 100 (D3:0) receives inputs on flow bus 102 and provides outputs on flow bus 102. The D register 100 interacts with selected registers in register file 76. Flow unit 72 may further include a quad adder 110 and a quad A register 112 (A3:0). Adder 110 receives inputs on flow bus 102, and inputs from selected registers in register file 76. The results are placed in A register 112, and A register 112 provides outputs on flow bus 102. Flow unit 72 may further include a quad D' register 114 (D'3:0) which receives inputs on BFD bus 124 and provides outputs on BFD bus 124. Flow unit 72 may include other functions 116, such as transfer, compare, exclusive OR, for example, and a configurable gate array (CGA) 117 to provide flexibility.

Flow operations are of two basic types: (1) a flow load operation from memory with an operation such as a shift across all sections, and (2) a flow store operation to memory, with an operation such as accumulate across all sections. Flow memory accesses are similar to SIMD memory accesses, except that they access memory by row rather than by column.

The following instructions support flow operations:
OP Rm==[Jm]; //Flow Load Instruction
[Jm] OP==Rm; //Flow Store Instruction The flow load instruction loads the Rm register from a memory location Jm and performs an operation OP across all sections, typically a delay line shift or a broadcast. The flow store instruction performs an operation OP, typically an accumulation, on register Rm across all sections and stores the results to a memory location Jm. The "==" sign indicates a flow instruction. The OP operation indicates several types of operations that can be performed during flow operations, for example, accumulate, shift, transfer, broadcast, and exclusive or. Flow operations are performed in the flow unit 72, which has access to the register file 76 in a manner similar to a memory access and may be thought of as an alternate memory access.

Figure 8A:
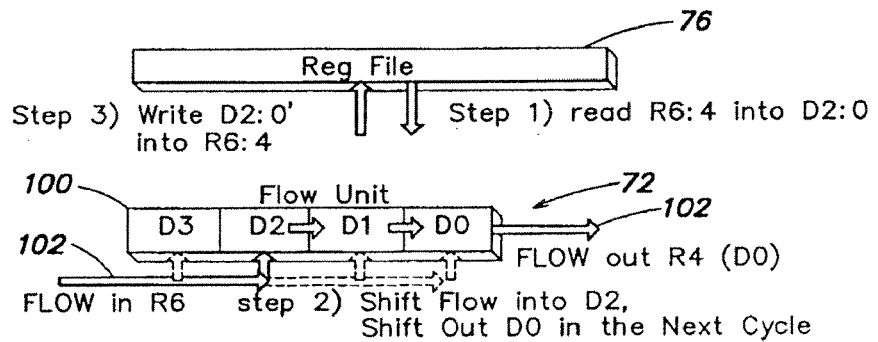
FIG. 8A is a schematic block diagram of the flow unit executing a flow load instruction.
Figure 8B:
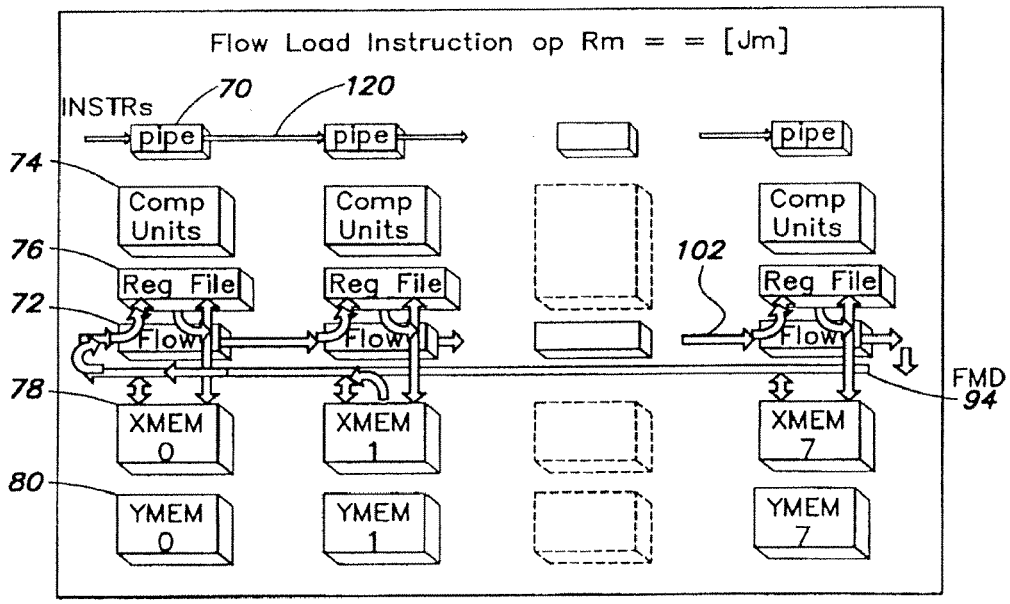
FIG. 8B is a schematic block diagram that illustrates execution of the flow load instruction.

The flow load operation, or DFLOW operation, is described with reference to FIGS. 8A and 8B. In connection with a flow load operation, flow unit 72 in each of the compute engines utilizes quad D register 100 (D3:0), which defines a flow load path. In first compute engine 50, the flow load operation involves a load from memory on FMD bus 94. In each of the other compute engines 51, 52, . . . , 57, the flow load operation involves a flow between sections on flow bus 102, the details depending on the specified operation OP and the specified register or registers.

Consider an example of a flow shift operation given by SH R6==[J3+=1], which implements a delay of three cycles in each section. The flow load operation begins in successive sections of compute array 32 on successive clock cycles. This instruction involves the following operations in each of the compute engines. First, registers R6:4 are read from register file 76 into locations D2:0 in quad D register 100. Next, register D0 is shifted out on flow bus 102. Then, registers D2:1 are shifted to registers D1:0, and the incoming flow is shifted to register D2. In the first section (compute engine 50), the incoming flow is from memory on FMD bus 94. In the other sections, the incoming flow is from the previous section on flow bus 102. Finally, registers D2:0 are written into registers R6:4 in register file 76.

In the flow load operation, the shift register length is determined by the entry point of the DFLOW instruction. In the flow load instruction, the register number is specified modulo 4. Thus, SH R2 and SH R14 both define a shift register having a length of three words. Further, the instruction can specify one to four words. The same number of registers are shifted out as are shifted in. The register options for the flow load operation are R0; R1; R1:0; R2; R2:1; R2:0; R3; R3:2; R3:1; and R3:0. Higher number registers are specified using modulo 4 notation.

A broadcast instruction of the type B R15:12==[mem] broadcasts the memory contents into registers R15:12 in each section of the compute array.

The flow store operation, or AFLOW operation, is described with reference to FIGS. 9A and 9B. In connection with a flow store operation, flow unit 72 utilizes adder 110 and quad A register 112 (A3:0), which define a flow store path. The flow unit 72 operates on data as it flows between sections of the compute array. The primary AFLOW operation is accumulation, but other operations such as exclusive or, compare, max/min, transfer, logical and shift may be utilized. The flow may be from any register in register file 76. The A register 112 holds accumulation results between sections. The output of the last section (compute engine 57) is stored in memory on FMD bus 94. The flow path can sum the Rn registers from each section of the compute array, so that the AFLOW output is the sum of all the Rn registers in the compute array. When AFLOW data enters a section, it is added to the local Rn registers and is output to the next section which receives the data in the following cycle. This repeats for all sections. The result appears at the last section after eight clock cycles. For example, the instruction [adr1]+==R0; sums register R0 from each of the eight sections of the compute array and stores the result at address adr in memory. The AFLOW operation initializes to zero the flow input to the first section of the compute array.

Figure 9A:
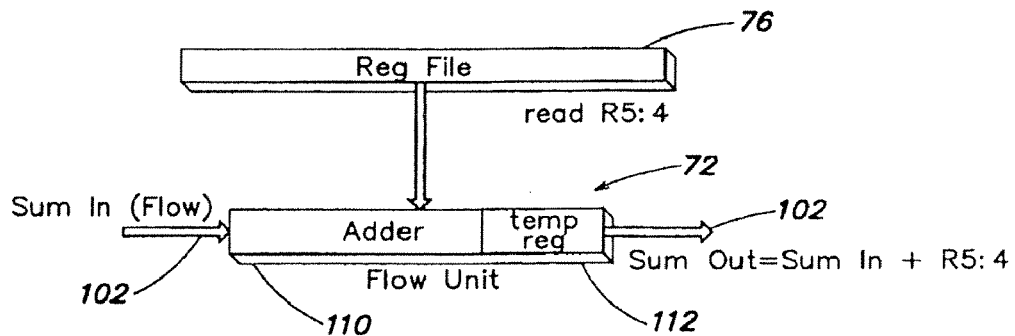
FIG. 9A is a schematic block diagram of the flow unit executing a flow store instruction.
Figure 9B:
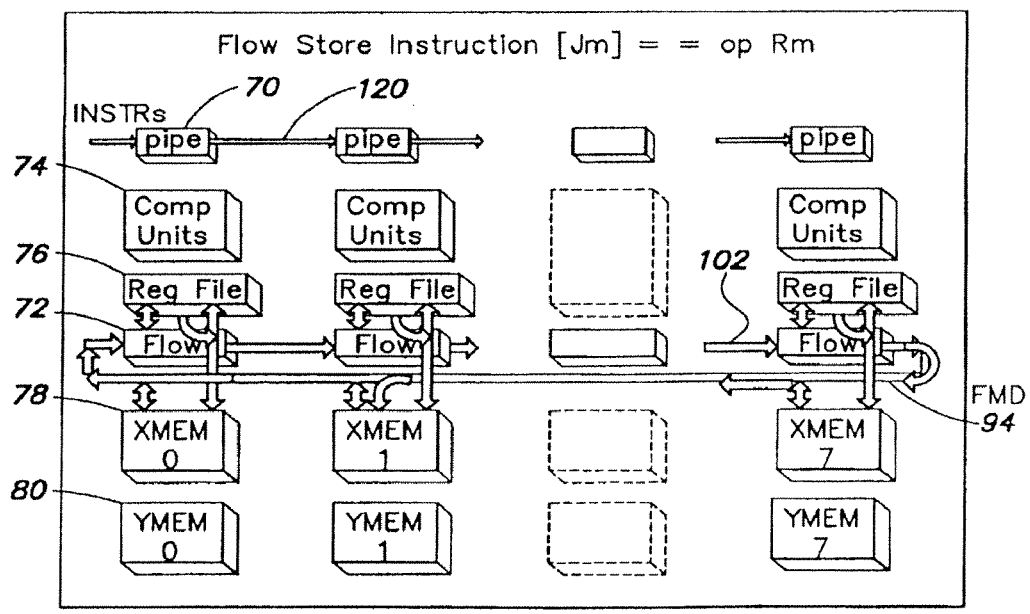
FIG. 9B is a schematic block diagram that illustrates operation of the flow store instruction.

Consider an example of a flow accumulate instruction given by [J3+=1]==+R5:4, as illustrated in FIG. 9A. The flow store operations begin in successive sections of compute array 32 on successive clock cycles. First, registers R5:4 are read from register file 76 and are summed with the incoming flow. The result is placed temporarily in A register 112. The sum out from A register 112 represents the flow input plus registers R5:4.

The flow unit 72 is described above as interacting with selected registers in register file 76. For example, the contents of D register 100 can be written to selected registers in register file 76, and vice versa. In addition, the contents of selected registers in register file 76 can be added to the flow data. In other embodiments, flow unit 72 does not interact with register file 76. Instead, compute block 74 may read from and write to registers in flow unit 72.

Datapath buses between compute engines 50-57 of compute array 32 are described with reference to FIG. 10A. Instruction bus 120 is connected between instruction pipes 70 of successive compute engines. Instructions enter and flow through the compute array on the instruction bus 120. Instructions enter the first section (compute engine 50) and are clocked into each successive section on each clock cycle. This bus supplies the addresses for two or three memory accesses and the controls for two compute operations. Much of the control logic for the compute array may be located in control block 30 so as to avoid duplication in each section. The three memory accesses in each cycle can be to X-memory 78 or 84, Y-memory 80 or 86 and DMA buffer 82. DMA buses 22 and 24 supply the compute array with DMA data, which may be driven by one of several input sources or sent to several output destinations. The DMA data is placed in the two quad word DMA buffer 82 in each section. The DMA bus can be used by the main processor 12 to access the compute array memory directly. DMA buses 22 and 24 can be used as two 128 buses or a single 256-bit bus. DMA buses 22 and 24 are coupled through a buffer 122.

The flow bus 102 allows data to transfer, broadcast or shift from section to section and to recirculate if more than eight sections are required. Typically, the flow data to be shared or to be shifted across the compute array enters the array in the first section and is shifted across all the sections. The flow bus 102 is also used to accumulate or otherwise operate on computation results by flowing the results from left to right in each section. Flow for the shift function and the accumulate or broadcast function are often needed together but not necessarily in the same cycle. Because flow operations can be arranged so they are not needed on every cycle, flow bus 102 can be used for both DFLOW and AFLOW operations if used in different cycles. In other embodiments, compute array 32 may include two or more flow buses, and DFLOW and AFLOW operations can execute simultaneously.

The FMD bus 94 is used to load data when grouping has not been selected. The FMD bus 94 is also used to store flow data to memory. The last compute engine in the group provides the data and the address tag for the store location. For loads, only the first section provides the address, and one of the sections 1-7 responds by driving its data to section 0. For stores without grouping, the last section provides the data and the address. FMD bus 94 is coupled to control block 30 through buffer 122.

The BFD bus 124 is used when groups of two or four compute engines are selected. The BFD bus 124 is switched to support grouping of sections. The BFD bus 124 allows flow data to return to the start of the group and is also used for flow memory access within the group. For groups of two or four compute engines, the BFD bus 124 is used for recirculation, for data shuffle and for flow memory access.

Figure 10B:
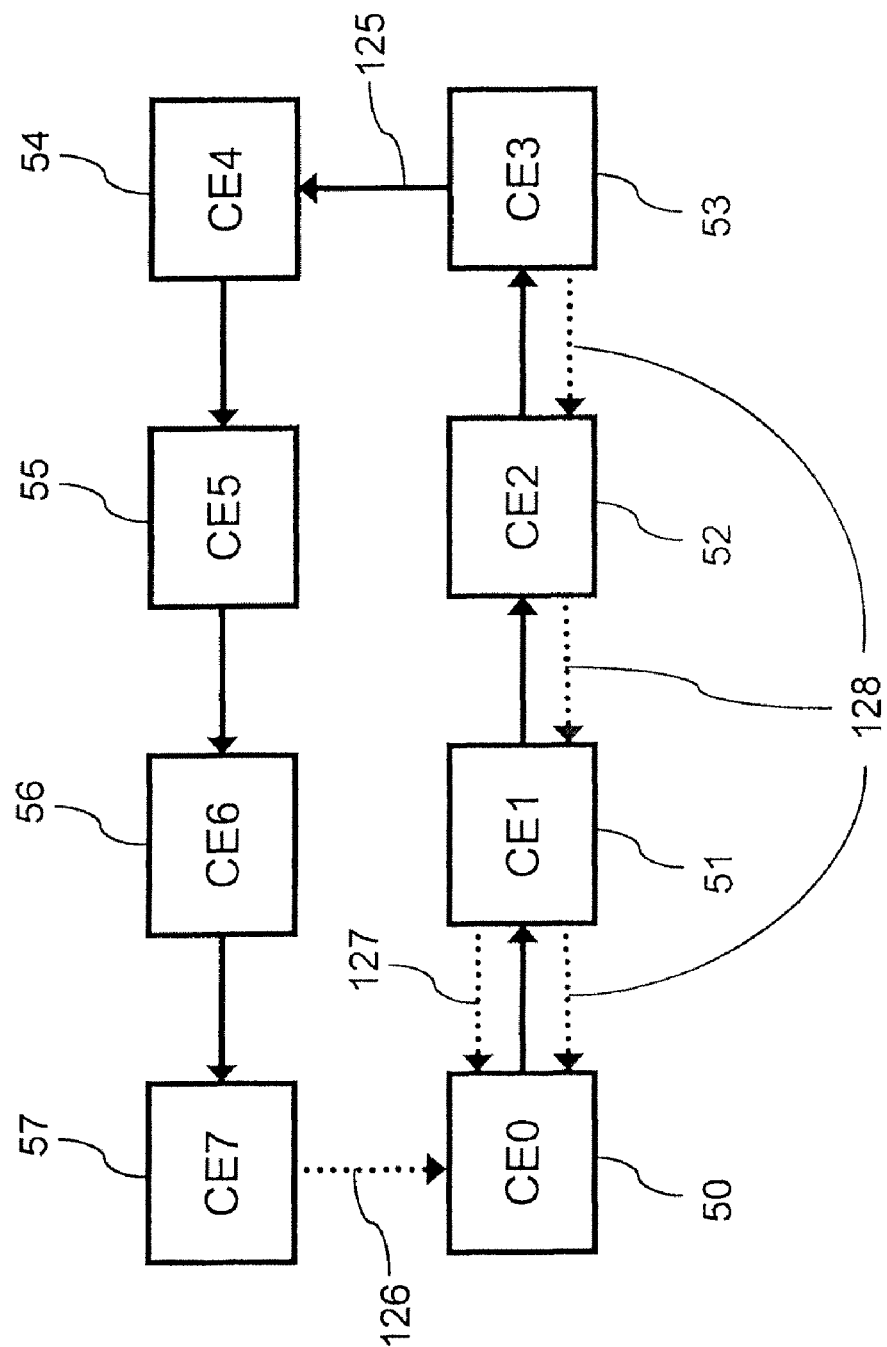
FIG. 10B is a schematic block diagram of the compute array depicted in FIG. 10A, showing data flow and recirculation paths in accordance with an embodiment of the invention.

FIG. 10B is a simplified version of FIG. 10A depicting compute engines 50-57 and various paths along which data may flow therebetween on, e.g., flow bus 102 and/or BFD bus 124. Data flow path 125, shown as solid arrows between compute engines 50-57, is the typical path along which data is shifted as successive instructions are executed in successive compute engines. For example, data flows from compute engine 50 to compute engine 51 on a single clock cycle, from compute engine 51 to compute engine 52 on the next clock cycle, etc. In the illustrated embodiment containing eight compute engines, data recirculates along recirculation path 126 from compute engine 57 back to compute engine 50 if more than eight instructions are executed. In the "circular" arrangement of compute engines 50-57 depicted in FIG. 10B, data flows along data flow path 125 and recirculation path 126 only between compute engines adjacent to each other; thus, each successive instruction may be executed on a successive clock cycle, i.e., latency is low.

As described above (and below with reference to FIG. 13), compute engines 50-57 may be grouped such that only a subset of the compute engines executes a particular group of instructions on particular data. For example, if only two compute engines are utilized in a group, data may flow along data flow path 125 from, e.g., compute engine 50 to compute engine 51, and then may recirculate back to compute engine 50 along recirculation path 127. As in the above-described embodiment utilizing eight compute engines, latency is low since the two grouped compute engines are adjacent. Any two adjacent compute engines may be grouped in the same advantageous fashion.

However, in the embodiment depicted in FIG. 10B, latency may result in groupings containing more than two and fewer than all eight compute engines 50-57. For example, in a group containing four compute engines 50-53, data mainly flows along data flow path 125 between compute engines with low latency. However, once the data reaches compute engine 53, it must recirculate to compute engine 50 along recirculation path 128. Since compute engines 50 and 53 are not adjacent, data recirculating on recirculation path 128 must flow back through compute engines 51 and 52 in order to reach compute engine 50. Thus, data flowing along recirculation path 128 requires three clock cycles to travel between compute engine 53 and compute engine 50, increasing latency and hampering the overall performance of processor 20. Similarly, increased latency results from compute engine groupings containing three, five, six, or seven compute engines, as recirculation between the final and initial compute engines in a group requires more than a single clock cycle.

Figure 10C:
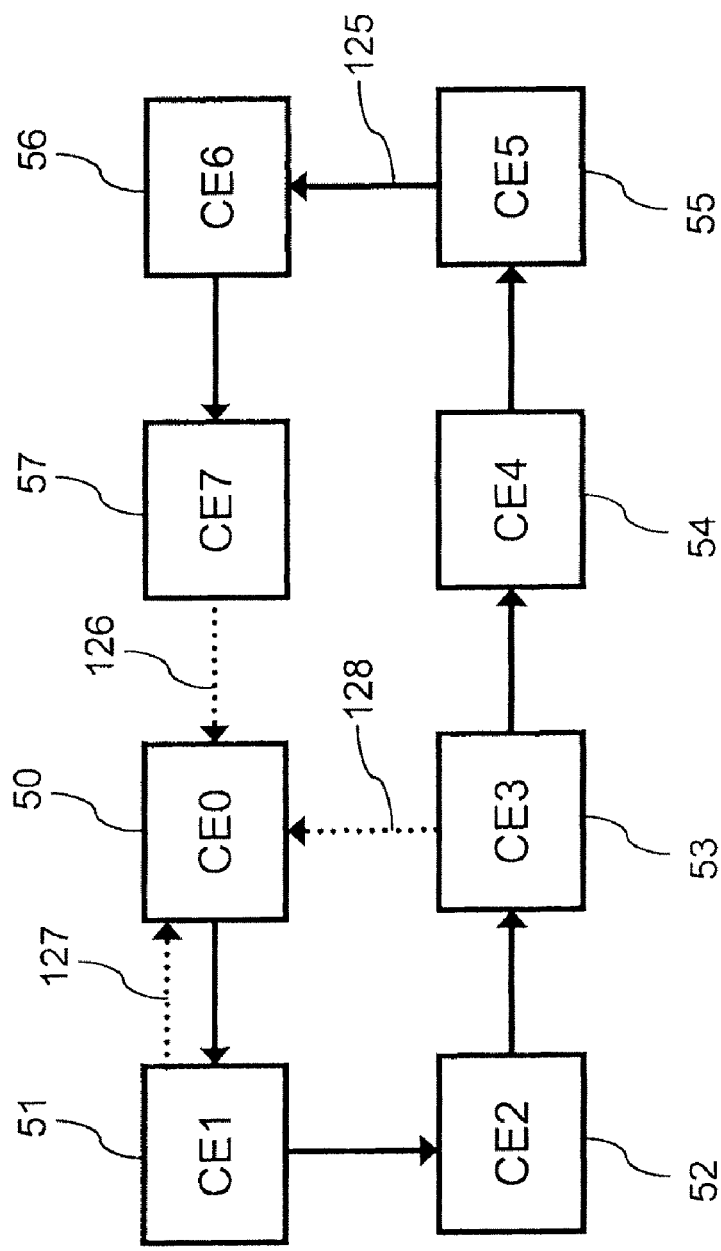
FIGS. 10C and 10D are schematic block diagrams of compute arrays, showing data flow and recirculation paths for alternative arrangements of compute engines in accordance with various embodiments of the invention.

Referring to FIG. 10C, an alternative arrangement of compute engines 50-57 decreases latency for groupings containing four compute engines while maintaining low latency for groupings of two or all eight compute engines. Just as in the embodiment depicted in FIG. 10B, compute engines 50 and 51 form a two-engine group having a single-cycle (i.e., low-latency) recirculation path 127, and compute engines 50-57 form an eight-engine group having a single-cycle recirculation path 126. In addition, the alternative arrangement depicted in FIG. 10C enables compute engines 50-53 to form a four-engine group having a single-cycle recirculation path 128, as compute engines 50 and 53 are adjacent. (Similarly, compute engines 54-57 may form another four-engine group having a low-latency recirculation path between adjacent compute engines 57 and 54.) Further, any recirculation latency in groupings of other numbers of compute engines 50-57 (i.e., groups having three, five, six, or seven compute engines) is no worse than in the embodiment illustrated in FIG. 10B.

Figure 10D:
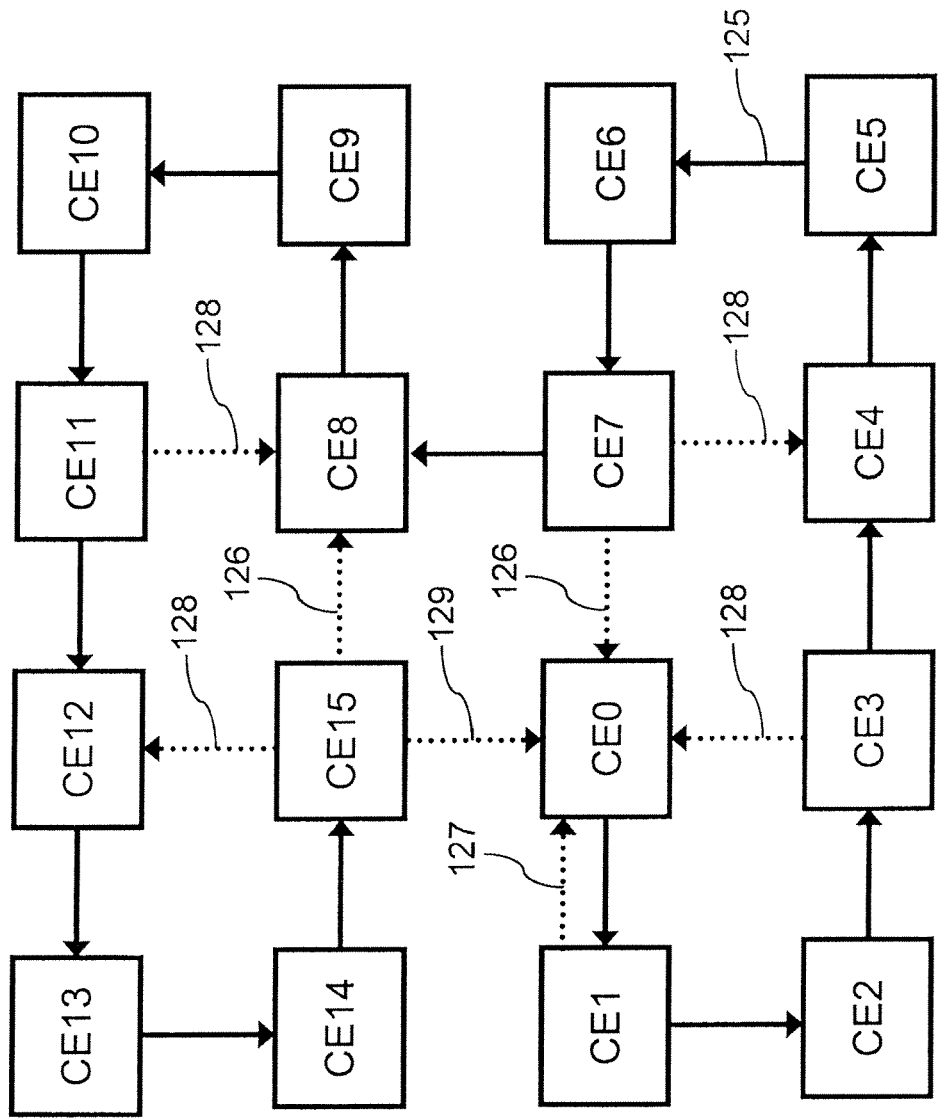

FIG. 10D depicts an arrangement of sixteen compute engines having low-latency recirculation paths for groups of two, four, eight, and sixteen compute engines. As in FIGS.

10B and 10C, single-cycle recirculation path 127 may be utilized between any two adjacent compute engines (for clarity, only one such recirculation path 127 is shown in FIG. 10D), single-cycle recirculation paths 128 are utilized in four-engine groups (e.g., groups including compute engines CE0-CE3, CE4-CE7, CE8-CE11, or CE12-CE15), and single-cycle recirculation paths 126 are utilized in eight-engine groups (e.g., groups including compute engines CE0-CE7 or CE8-CE15). Additionally, single-cycle recirculation path 129 connects compute engines CE15 and CE0 when data is cycling through all sixteen compute engines.

Figure 11:
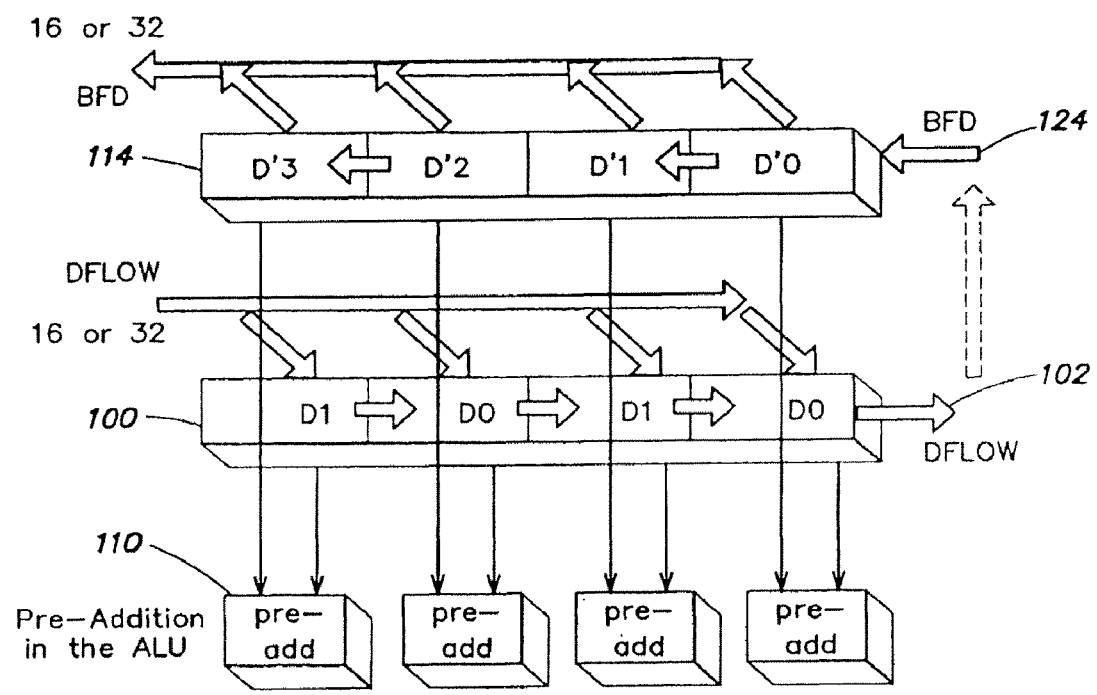
FIG. 11 is a schematic block diagram that illustrates symmetric filter computations in accordance with an embodiment of the invention.

The DFLOW path permits pre-addition of taps for symmetric filters to double performance. Symmetric filters have coefficients that are symmetric about a center point of the filter. Data values corresponding to equal coefficients can be pre-added prior to multiplication by the coefficients, thereby reducing the required number of multiplications. The taps needed for pre-addition can be made available by flowing the BFD bus 124 through the D'3:0 registers as shown in FIG. 11. When using 16-bit data, the data is accessed as two pairs of long words. Registers D'1:0 and D1:0 are added in the ALU and then multiplied by four short coefficients with sideways sum. The number of taps per section can be two, four, or eight for 32-bit data. For 16-bit data, the most efficient use is with eight or sixteen taps per section. To implement the back flowing shift register, 16 or 32 bits of the BFD bus 124 are redirected to pass through the D'3:0 registers. This shifts in the opposite direction to the DFLOW path.

A memory address bus 118 (FIG. 4) provides flow memory addresses when loading or storing from X-memory 78 or 84, or Y-memory 80 or 86. The address is available to all sections in the group in the same cycle, but only the section in the group with the corresponding address responds.

Figure 12:
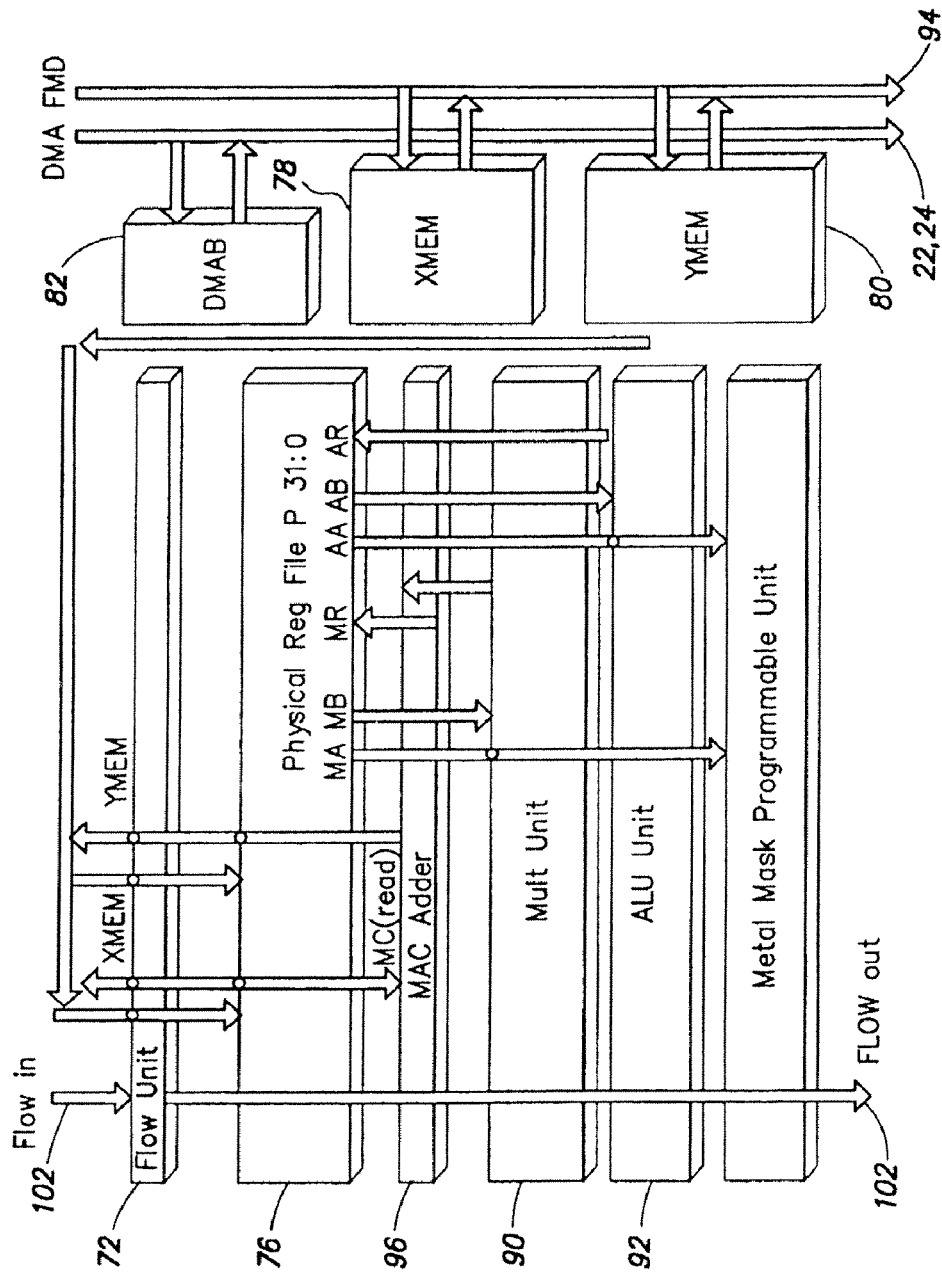
FIG. 12 is a schematic block diagram of a compute engine in accordance with an embodiment of the invention.

One of the compute engines is shown in greater detail in FIG. 12. Register file 76 may be a multi-port register file having between 32 and 64 registers. The register file 76 supports multiplier 90, ALU 92, flow unit 72, MAC adder 96, and memory banks 78 or 84 and 80 or 86, and may have ten ports to support these units. The multiplier 90 and the flow unit 72 perform a read-modify-write in each cycle. The register file 76 may also have a shadow copy which can be used for a single cycle context switch to support interrupts when streaming data.

The multiplier 90 may be a 32×32 fixed point multiplier, with built-in correlation capabilities and selectable data precision. The multiplier can perform quad 16-bit multiplies with both real and complex data types. Complex 16-bit data includes 8-bit real and 8-bit imaginary data. An additional cycle of latency is required for 32×32 multiplies. The MAC adder 96 and the multiplier 90 are semi-independent units. The path from the multiplier to the MAC adder may contain partial sums which can be resolved in the MAC adder.

Figure 13:
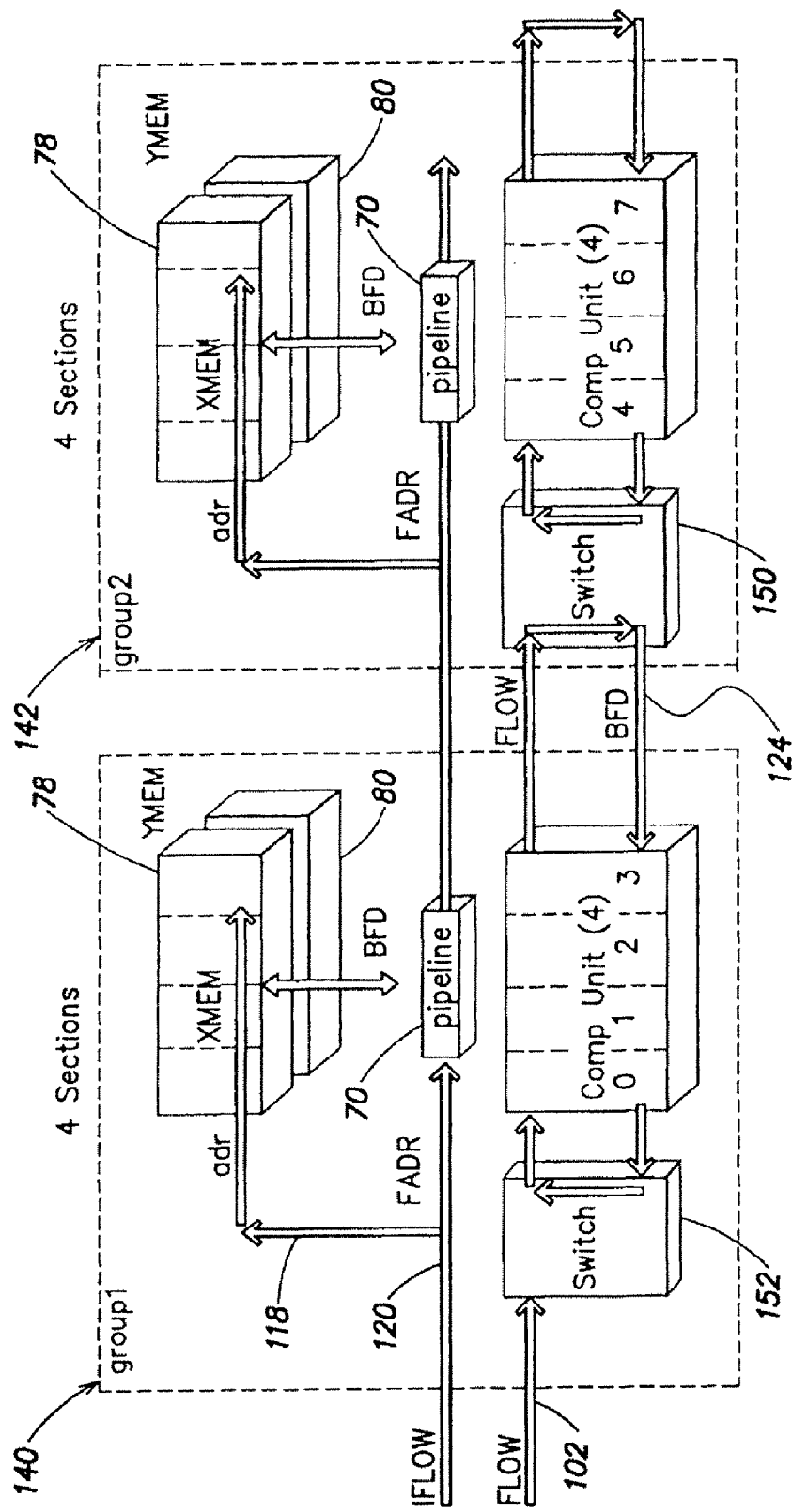
FIG. 13 is a schematic block diagram that illustrates grouping of compute engines.

The versatility of the flow architecture is enhanced by the ability to group sections during flow operations. This allows tasks that require a smaller number of operations to be optimally managed. Examples include 4-tap FIRs and 4×4 matrix operations. The grouping uses the special organization on the BFD bus 124 to select different memory sections for this purpose. The group operation is specified by the flow instructions on a cycle-by-cycle basis. Grouping allows flow operations to occur within subsets of the eight sections. As shown in FIG. 13, the first four sections (0-3) can be combined into a first group 140 and the last four sections (4-7) can be combined into a second group 142, for example. Each group recirculates its data within the group and each group may operate on different data. The compute array can be subdivided into four groups of two or two groups of four. Grouping can also be used to provide odd numbers of sections working together, e.g. three or seven sections. The unused sections apply automatic zero padding. The group control can apply two types of actions: (a) common data to all groups, or (b) independent groups where group memory data is used within the group.

Groups are configured using the switches 104 and 106 (FIG. 3) in appropriate compute engines. An example of compute array 32 configured as groups 140 and 142, each having four compute engines and each having recirculation of flow data, is shown schematically in FIG. 13. A switch 150 between sections 3 and 4 connects the flow bus 102 output of section 3 to the BFD bus 124 in section 3 and connects the flow bus 102 input of section 4 to the BFD bus 124 in section 4. Also, a switch 152 in section 0 connects the flow bus 102 input of section 0 to the BFD bus 124 in section 0. This permits separate flow operations within groups 140 and 142.

When more than eight sections are required for an application, the compute array allows the flow operation to recirculate, creating the effect of a very long flow array. The number of recirculations is practically unlimited, but throughput remains limited by the number of compute engines, i.e. the compute engines are time-shared. Recirculation feeds the DFLOW and AFLOW operations from the last section back to the first section or from the end of a group to the start of a group. At the end of the recirculation sequence, the accumulated result is written to memory.

Shuffle is an operation wherein memory data is interchanged between sections of the compute array. Data can be shuffled, or interchanged, in groups of two, four or eight. This operation is useful for the fast Fourier transform where the first three stages interchange data between sections when the data is stored sequentially in memory in rows. The shuffle operation uses the load row cache and the store row cache as a buffer. Initially, data is transferred from selected memory locations in each section to the load row cache. Then, the load row cache of each section is moved, in a shuffle operation, to the store row cache of the next section using the flow and BFD buses. This operation is repeated for the desired shuffle shift. Then, the store row cache is stored to the specified memory locations in all sections. A quad word is transferred each time the shuffle operation is executed. If the shuffle is between nearest neighbors, the shuffle operation is executed once. If the shuffle is between sections four spaces apart, then the shuffle operation is repeated twice. If the shuffle is between sections eight spaces apart, the shuffle operation is repeated four times.

Figure 14:
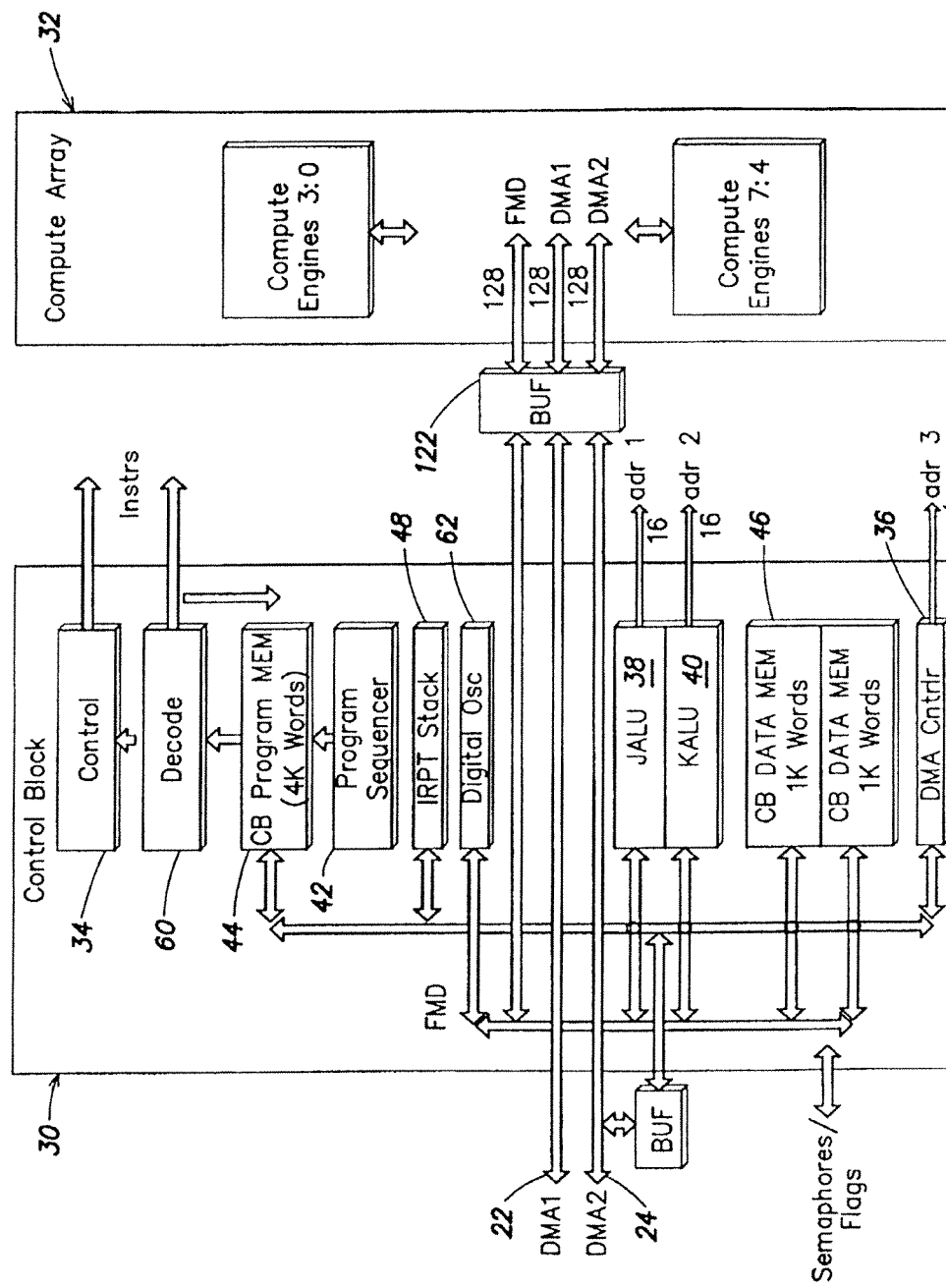
FIG. 14 is a schematic block diagram of an embodiment of the control block shown in FIG. 2.

FIG. 14 shows the elements of the control block 30 and their interactions with the compute array 32 and the system buses. The control block 30 includes program memory 44, program sequencer 42, integer ALUs JALU 38 and KALU 40, an interrupt controller and interrupt stack 48, DMA controller 36 and control logic 34. In addition, data memory 46 is used for storing parameters and for saving and restoring during context switch. Data memory 46 may include two small memory banks of 1K words, for example. Control block 30 may further include a decode unit 60 and a digital oscillator 62. Two local buses in control block 30 allow ALUs 38 and 40 to save and restore to the banks of data memory 46. The save/restore can operate simultaneously in the compute array 32 and the control block 30, doubling the performance compared to the main processor.

The control block 30 issues instructions (load/store and compute) to compute array 32. Instructions enter the compute array 32 at compute engine 50 and pass into each compute engine sequentially on successive clock cycles until they exit the array eight clock cycles later. The flow data specified in the instruction enters the array and flows through the compute array in the same way.

The DMA bus 22 connects only to the compute array 32 and is used primarily to transfer I/O data to the memory of compute array 32. DMA bus 22 can also be used to transfer data from the main memory 14. The DMA bus 24 can connect either to the compute array 32 or to the control block 30 and allows direct read/write between the processor 20 and main memory 14, in either direction. The transfers can be via DMA or program control. The control processor 12 (FIG. 1) can access the processor 20 via the DMA bus 24 to read or write certain registers, write an interrupt vector or check on status, download program memory, or download or upload data memory in either the control block 30 or in the compute array 32.

The program memory 44 is relatively small compared to the program memory available in the control processor 12. The memory may be 4K words of 32 bits and may be implemented as a cache. The program memory may be 256-bits wide to allow up to eight instructions to be issued per cycle, including two instructions for the IALUs, one instruction for the program sequencer and two instructions for the compute array computations plus one extra instruction for immediate data. The data memory 46 is used primarily to hold additional parameters for the IALUs and for save/restore on context switches. The program sequencer 42 is a simplified version of the program sequencer used in the main processor 12 and fetches up to eight instructions per cycle. The program sequencer includes a program counter, branch hardware, a branch target buffer, an interrupt vector table, etc. The JALU 38 and the KALU 40 are integer ALUs having an address space of 32 bits. Each of JALU38 and KALU40 can access either compute array memory bank. Interrupt stack 48 allows multiple interrupts to be serviced sequentially according to their priority.

The processor 20 may support data streaming from DMA or directly from I/O ports via a FIFO to the flow path. The streaming data passes through compute array 32 and is processed without being loaded from memory. Data streaming may be supported by a fast context switch. In data streaming, I/O data is not written to memory but is placed in the DMA buffer 82 to be processed directly by the compute engines.

Figure 15:
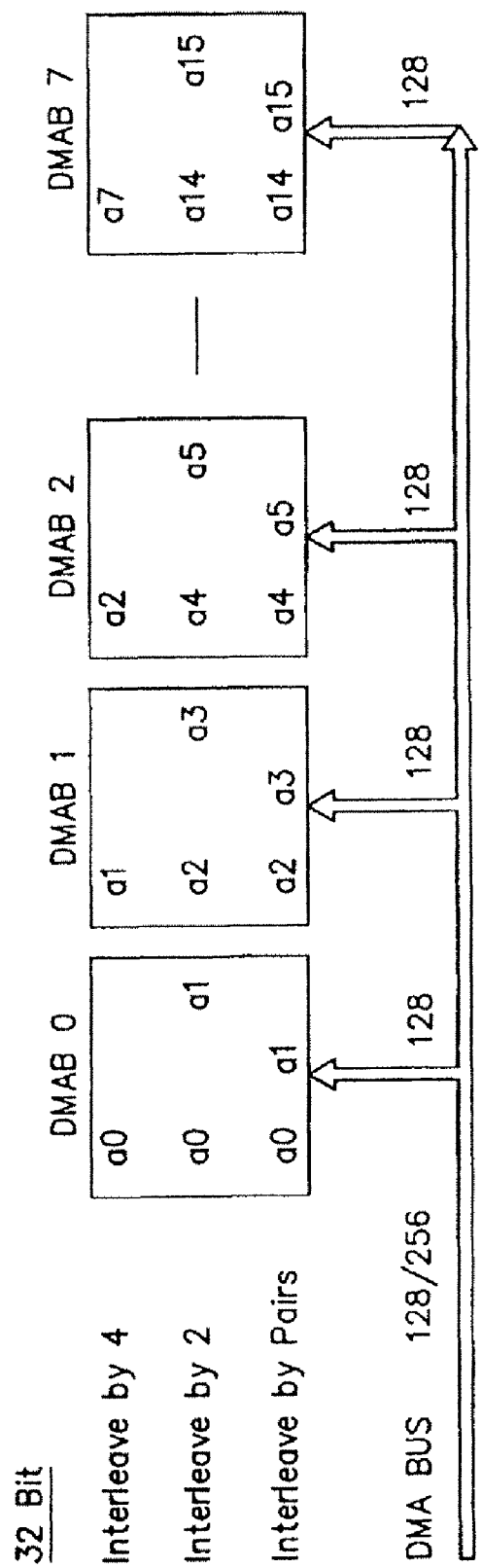
FIG. 15 is a schematic block diagram that illustrates DMA interleaving in accordance with an embodiment of the invention.

DMA interleaving may be utilized as shown in FIG. 15. DMA buffers 82 for each section are illustrated in FIG. 15. In order to interleave by four, as shown in the first row of FIG. 15, two quad words are loaded into location DMAB (0) of each buffer. Then two quad words are loaded into location DMAB (1) of each DMA buffer; two quad words are loaded into location DMAB (2) of each DMA buffer; and two quad words are loaded into location DMAB (3) of each DMA buffer. In order to interleave by two, as shown in the second row of FIG. 15, four quad words are loaded into locations DMAB (2,0) of each DMA buffer and then four quad words are loaded into locations DMAB (3,1) of each DMA buffer. In order to interleave by pairs, as illustrated in the third row of FIG. 15, four quad words are loaded into locations DMAB (1,0) of each DMA buffer and then four quad words are loaded into locations DMAB (3,2) of each DMA buffer. For DMA transfers with no interleave, quad words are loaded sequentially by section. In order to perform a SIMD load, one section of the DMA buffer is loaded at a time. In addition, group loading can be performed by loading groups of DMA buffers.

The SIMD-FLOW architecture of compute array 32 is well-suited to operating on data sets either by column or by row or by a combination of row and column. The following examples illustrate such operations.

Figure 16:
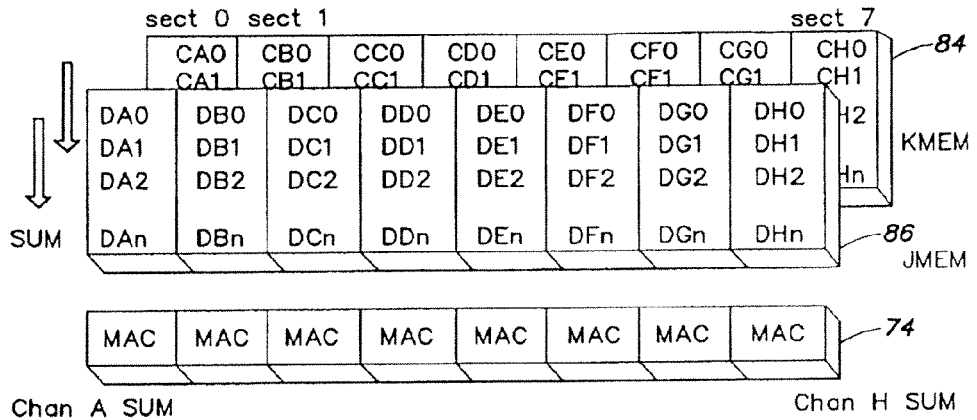
FIG. 16 is a schematic diagram that illustrates column-by-column processing using a processor in accordance with an embodiment of the invention.

FIG. 16 shows a column-by-column dot product where each section of the compute array operates SIMD-style on a single channel (eight channels DA through DH). No data is shared between sections of the compute array. This works well if the arriving data sets are arranged in columns and there is no data to be shared. Thus in section 0, coefficient CA0 is multiplied by data DA0, coefficient CA1 is multiplied by data DA1, etc., and the results are accumulated to provide a channel A sum. Similar operations are performed in the other sections.

Figure 17:
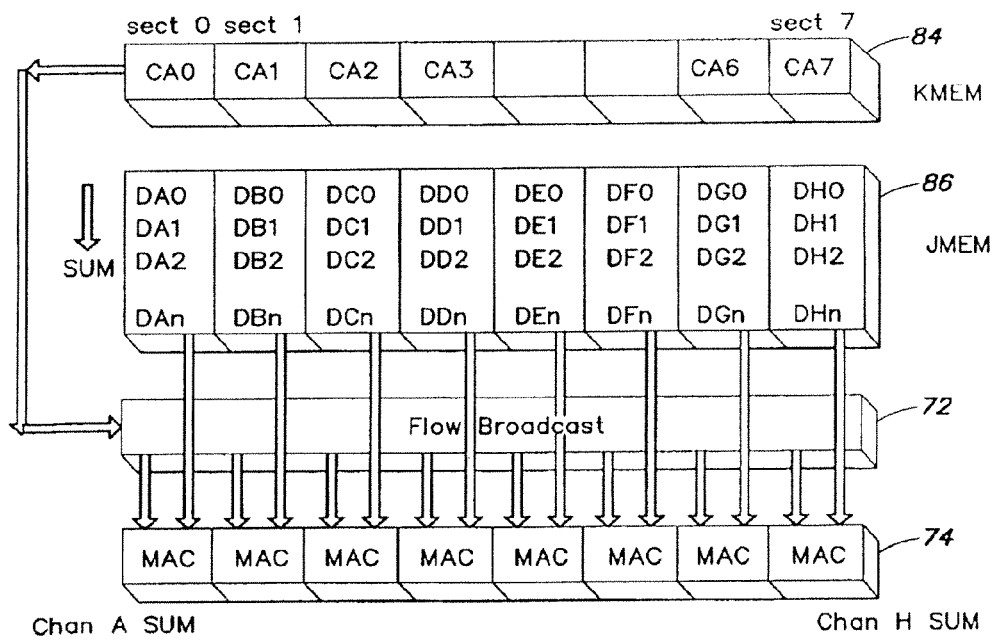
FIG. 17 is a schematic diagram that illustrates row-by-column processing using a processor in accordance with an embodiment of the invention.

Row-by-column processing is illustrated in FIG. 17. The coefficients CA0-CA7 are arranged horizontally by row in memory while the data DA0-DAn is arranged vertically by column in memory. Each coefficient is flowed (broadcast) across the entire array using the DFLOW path. The coefficients flow through each section, along with the corresponding instruction, so that each section appears to be performing the same operation but time-delayed. This is an example of a SIMD multiply accumulate operation with shared coefficients. For beam-forming, this allows one set of coefficients to be shared by all time samples of each antenna (horizontal) while the summation is done across all the antennas (vertically). If the data and coefficients are interchanged, a polyphase FIR filter can be implemented, with each section implementing a different phase of the filter from the same data. Matrix multiply can be done with the method of FIG. 17. The row of one matrix C is broadcast and multiplied with eight columns of the second matrix D. The eight results are in the MAC of each section.

Figure 18:
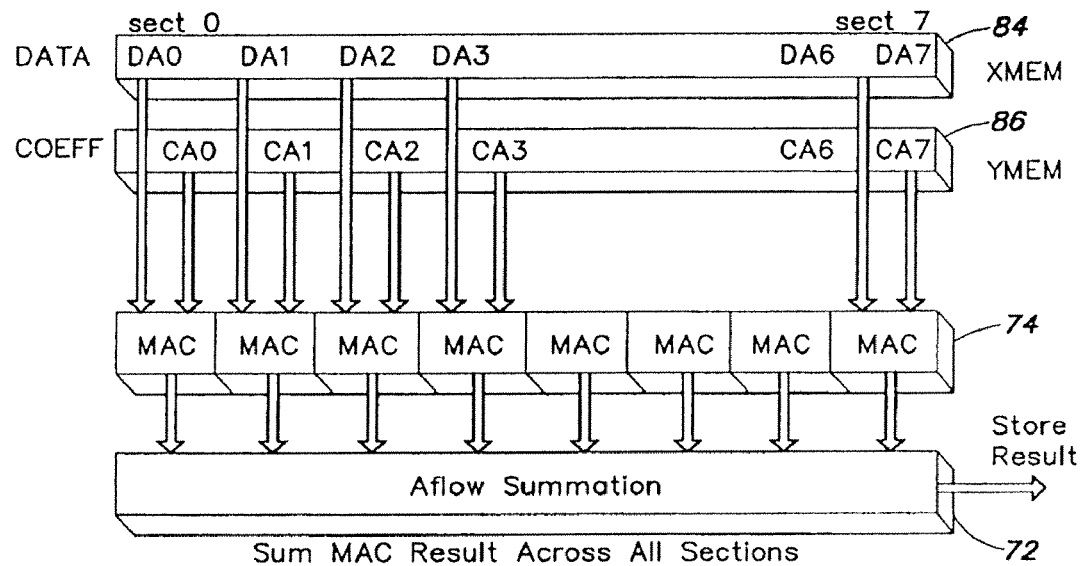
FIG. 18 is a schematic diagram that illustrates row-by-row processing using a processor in accordance with an embodiment of the invention.

Row-by-row processing is illustrated in FIG. 18. The example of FIG. 18 shows a row-by-row dot product as in a vector-by-vector multiplication. In row-by-row operations, neither data nor coefficients are flowed, but the multiplier result from each section is accumulated in the AFLOW path. Each section sums its product with the arriving sum and passes the result on to the next section.

Figure 19:
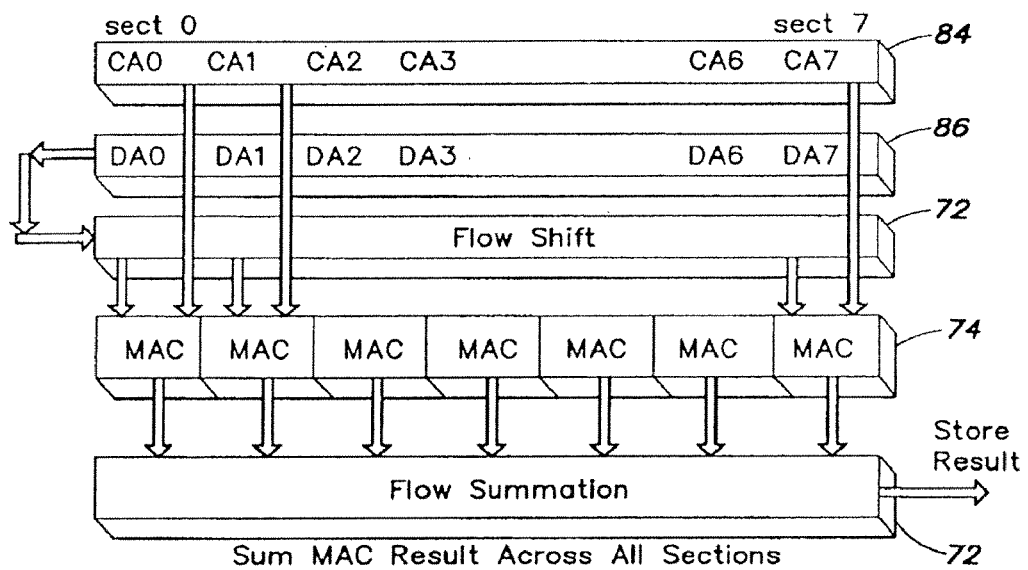
FIG. 19 is a schematic diagram that illustrates row-by-row processing with shift using a processor in accordance with an embodiment of the invention.

Row-by-row processing with shift is illustrated in FIG. 19. The example of FIG. 19 shows how an FIR filter can be implemented with a row-by-row operation. The row of data is stored in a shift register (DFLOW path) to implement a tapped delay line. The data is maintained in memory, then loaded into the flow path, shifted and optionally returned to memory. To save power and memory bandwidth, the load and store operations can be performed after multiple shifts. When operating on a small number of channels, the DFLOW data can be kept in the register file and this data is not copied to memory.

Figure 20:
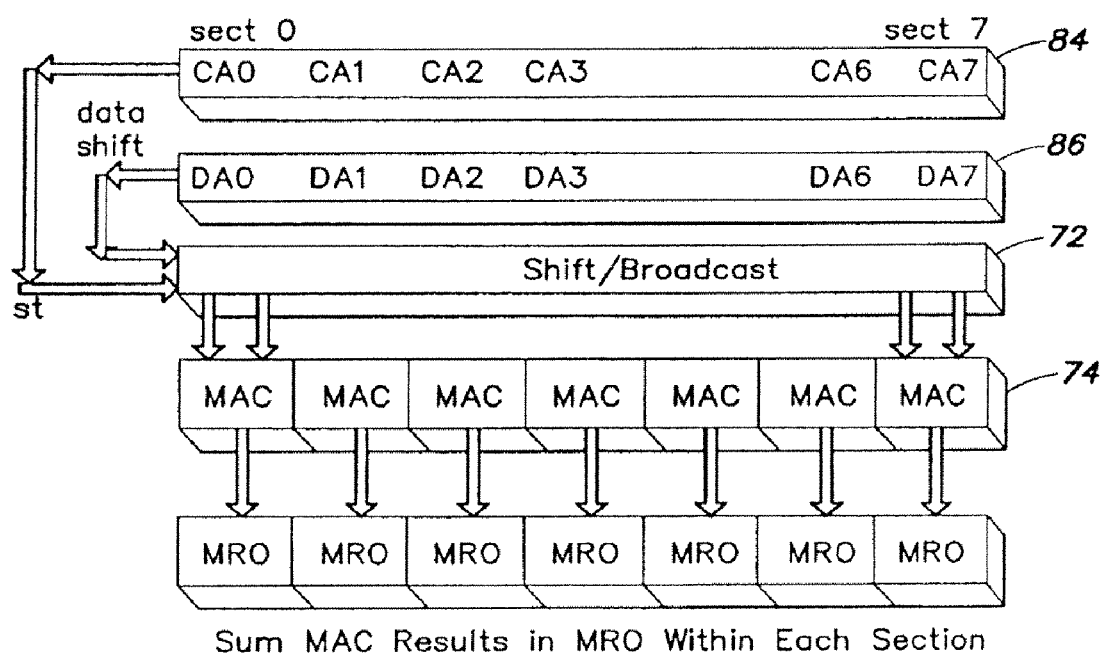
FIG. 20 is a schematic diagram that illustrates row-by-row processing with shift and broadcast using a processor in accordance with an embodiment of the invention.

Row-by-row processing with shift and broadcast is illustrated in the example of FIG. 20. FIG. 20 shows a variant of an FIR filter implementation where the data is shifted as usual in the delay line, but the coefficients are flow broadcast to all sections. The accumulation is done in place in an accumulation register MR0 in each section and these are stored using a SIMD instruction.

Processor 20 is shown in FIG. 1 and described above as operating with a control processor. However, processor 20 is not limited in this respect. The architecture of processor 20 permits operation as a stand-alone processor configured for computation-intensive applications.

As described above, processor 20 can perform flow operations that flow from compute engine to compute engine on successive cycles, can perform SIMD operations within individual compute engines and can perform a combination of flow operations and SIMD operations. Flow operations are driven by flow instructions, and SIMD operations are driven by SIMD instructions. Memory may be accessed according to the type of operation being performed. In the compute array, multiple compute engines receive the same instructions but delayed in time. Processor 20 includes a common sequencer and address generators for multiple compute engines.

The processor architecture described herein achieves low power dissipation. The design is compact and uses short bus lengths and small drivers. The power consumption in the control block is amortized over multiple compute engines. Small memories are utilized, and reduced data movement is required for many applications. The register file may have a capacity of 256 words, so that fewer memory accesses are required. The design may be optimized for deep pipelines and low voltage rather than for fast devices.

The terms and expressions employed herein are used as terms and expressions of description and not of limitation, and there is no intention, in the use of such terms and expressions, of excluding any equivalents of the features shown and described or portions thereof. In addition, having described certain embodiments of the invention, it will be apparent to those of ordinary skill in the art that other embodiments incorporating the concepts disclosed herein may be used without departing from the spirit and scope of the invention. Accordingly, the described embodiments are to be considered in all respects as only illustrative and not restrictive.

What is claimed is:

1. A processor comprising:
   a compute array comprising a first plurality of compute engines serially connected along a data flow path such that data flows between successive compute engines at successive times, the first plurality of compute engines comprising an initial compute engine and a final compute engine,
   wherein a first subset of the first plurality of compute engines is configured to execute flow instructions and a second subset of the first plurality of compute engines is configured to execute single-instruction-multiple-data (SIMD) instructions.

2. The processor of claim 1, wherein the data flow path comprises a recirculation path connecting the final compute engine to the initial compute engine with no compute engine therebetween.

3. The processor of claim 1, wherein none of the first plurality of compute engines comprises a program sequencer for fetching instructions.

4. processor of claim 1, wherein none of the first plurality of compute engines comprises a program memory for storage of instructions.

5. The processor of claim 2, further comprising a second plurality of compute engines configured to recirculate data independent of the first plurality of compute engines.

6. The processor of claim 2, wherein the recirculation path is configured to recirculate data from the final compute engine to the initial compute engine in one clock cycle.

7. The processor of claim 1, wherein the first plurality of compute engines consists essentially of the initial compute engine and the final compute engine.

8. The processor of claim 1, wherein the first plurality of compute engines consists essentially of the initial compute engine, the final compute engine, and six additional compute engines disposed therebetween on the data flow path.

9. The processor of claim 1, wherein the first plurality of compute engines consists essentially of the initial compute engine, the final compute engine, and two additional compute engines disposed therebetween on the data flow path.

10. The processor of claim 1, wherein the first plurality of compute engines consists essentially of the initial compute engine, the final compute engine, and fourteen additional compute engines disposed therebetween on the data flow path.

11. The processor of claim 1, further comprising a control block for issuing instructions to the compute array based on a stored program,
    wherein the compute array is configured to execute the issued instructions in successive compute engines at successive times.

12. The processor of claim 1, further comprising a memory operative with each of the first plurality of compute engines.

13. The processor of claim 1, wherein each of the first plurality of compute engines has a pipeline architecture.

14. The processor of claim 1, wherein the processor is disposed within a digital signal processor that further comprises a control processor.

15. A method of forming a processor, the method comprising:
    forming a compute array comprising a first plurality of compute engines serially connected along a data flow path such that data flows between successive compute engines at successive times, the first plurality of compute engines comprising an initial compute engine and a final compute engine,
    wherein a first subset of the first plurality of compute engines is configured to execute flow instructions and a second subset of the first plurality of compute engines is configured to execute single-instruction-multiple-data (SIMD) instructions.

16. The method of claim 15, wherein the data flow path comprises a recirculation path connecting the final compute engine to the initial compute engine with no compute engine therebetween.

17. The method of claim 15, wherein none of the first plurality of compute engines comprises a program sequencer for fetching instructions.

18. The method of claim 15, wherein none of the first plurality of compute engines comprises a program memory for storage of instructions.

19. A method of data processing in a compute array comprising a first plurality of compute engines, the first plurality of compute engines comprising an initial compute engine and a final compute engine and at least one compute engine therebetween, the method comprising:
    flowing data between successive compute engines at successive times, beginning with the initial compute engine; and
    after data flows to the final compute engine, recirculating data from the final compute engine directly to the initial compute engine,
    wherein a first subset of the first plurality of compute engines is configured to execute flow instructions and a second subset of the first plurality of compute engines is configured to execute single-instruction-multiple-data (SIMD) instructions.

20. The method of claim 19, further comprising flowing data among a second plurality of compute engines independent of the first plurality of compute engines.

21. The method of claim 19, wherein data recirculates from the final compute engine to the initial compute engine in one clock cycle.

22. The method of claim 19, wherein the first plurality of compute engines consists essentially of the initial compute engine and the final compute engine.

23. The method of claim 19, further comprising forming six additional compute engines disposed between the initial compute engine and the final compute engine on the data flow path.

24. The method of claim 19, further comprising forming two additional compute engines disposed between the initial compute engine and the final compute engine on the data flow path.

25. The method of claim 19, further comprising forming fourteen additional compute engines disposed between the initial compute engine and the final compute engine on the data flow path.

26. A processor comprising:

a compute array comprising at least three compute engines;

a data flow path connecting the compute engines, data flowing along the data path between successive compute engines at successive times; and a recirculation path directly connecting two compute engines not directly connected along the data flow path, wherein at least one of the compute engines is configured to execute flow instructions and at least one of the compute engines is configured to execute single-instruction-multiple-data (SIMD) instructions.

* * * * *